United States Patent [19]

Pavlov

[11] Patent Number: 4,640,164

[45] Date of Patent: Feb. 3, 1987

[54] HIGH SPEED WIRE CUTTER

[75] Inventor: Ivan K. Pavlov, Palatine, Ill.

[73] Assignee: Essex Group, Inc., Fort Wayne, Ind.

[21] Appl. No.: 729,599

[22] Filed: May 2, 1985

[51] Int. Cl.[4] .......................................... B23D 25/12
[52] U.S. Cl. ...................................... 83/304; 83/285;
  83/337; 83/343; 83/154
[58] Field of Search ................ 83/304, 285, 343, 296,
  83/337, 287

[56] References Cited

U.S. PATENT DOCUMENTS

| | | | |
|---|---|---|---|
| 1,304,034 | 5/1919 | Edwards . | |
| 2,401,639 | 6/1946 | Hawthorne . | |
| 2,451,948 | 10/1948 | Hawthorne . | |
| 3,057,239 | 10/1962 | Teplitz | 83/337 |
| 3,477,326 | 11/1969 | Rainey | 83/296 |
| 3,561,311 | 2/1971 | Nowak | 83/304 |
| 3,875,838 | 4/1975 | Reppert | 83/285 |
| 4,065,992 | 1/1978 | Peters et al. | 83/285 |
| 4,162,642 | 7/1979 | Greven | 83/328 |

Primary Examiner—Donald R. Schran
Attorney, Agent, or Firm—James M. Rashid

[57] ABSTRACT

An apparatus for cutting a length of wire into wire segments includes a pair of adjacent knife carriers, each disposed for rotation about parallel eccentric shafts. The knife carriers each hold a knife blade having a cutting edge. The cutter is constructed and arranged such that the carriers can selectively rotate about either the axis of rotation of the eccentric, wherein the cutting edges do not cut the wire passing between the cutter, or they can rotate about the center of the eccentric, wherein the edges will cut the wire. When the cutting edges cut the wire, their tangential speed is the same as the wire speed.

5 Claims, 25 Drawing Figures

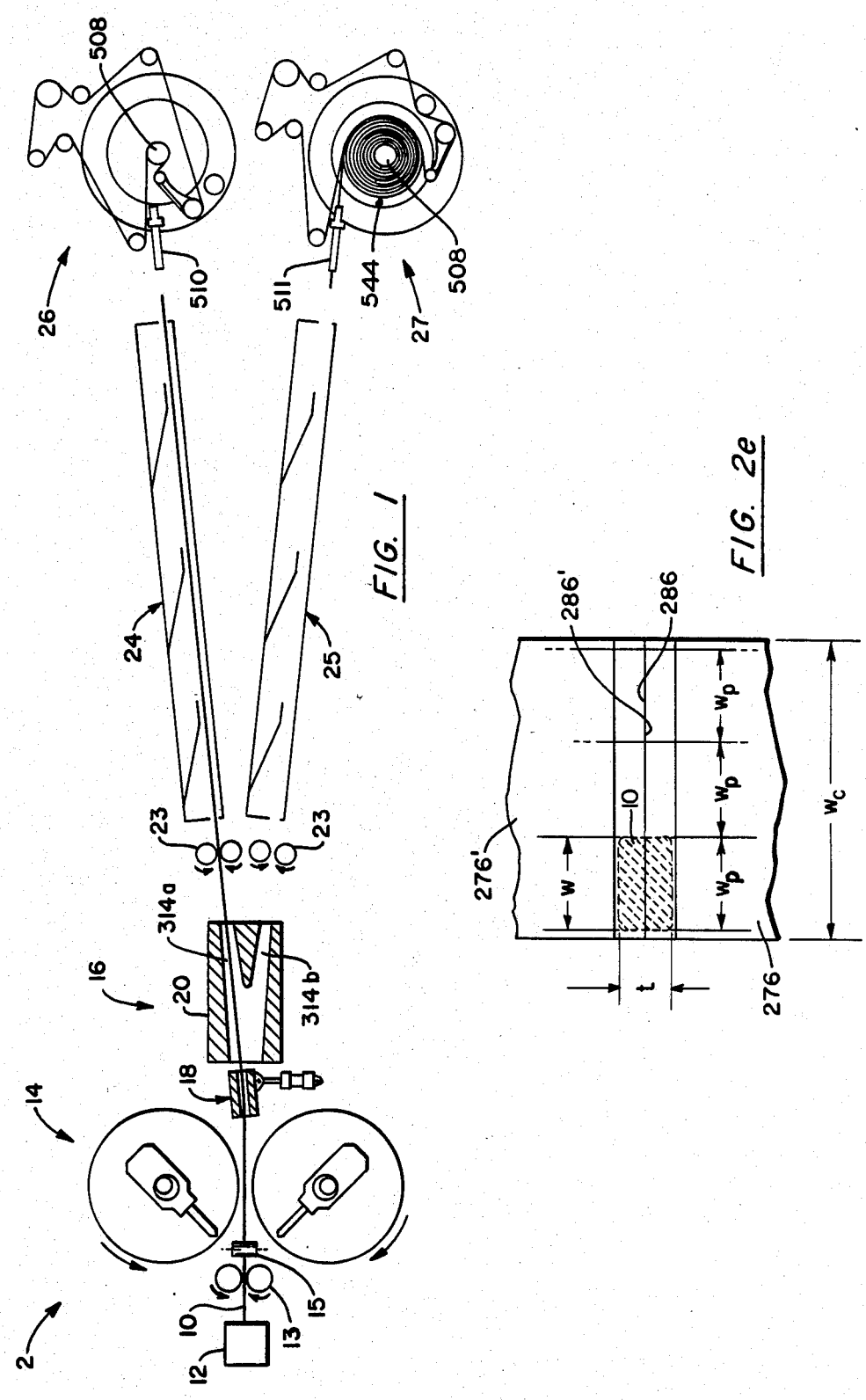

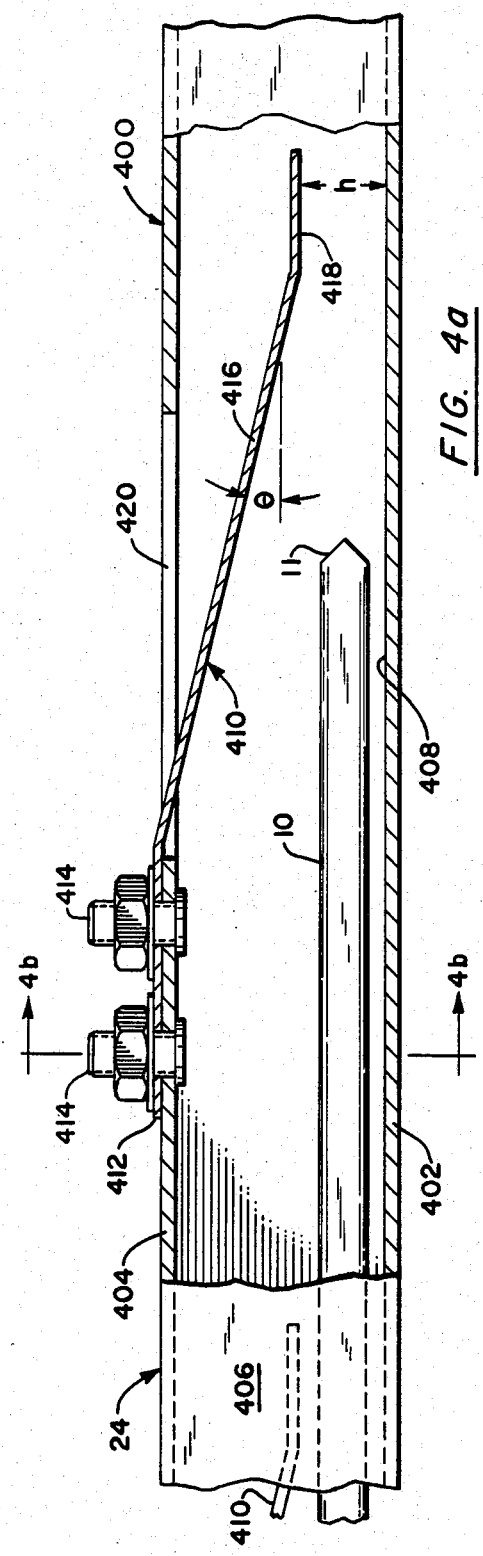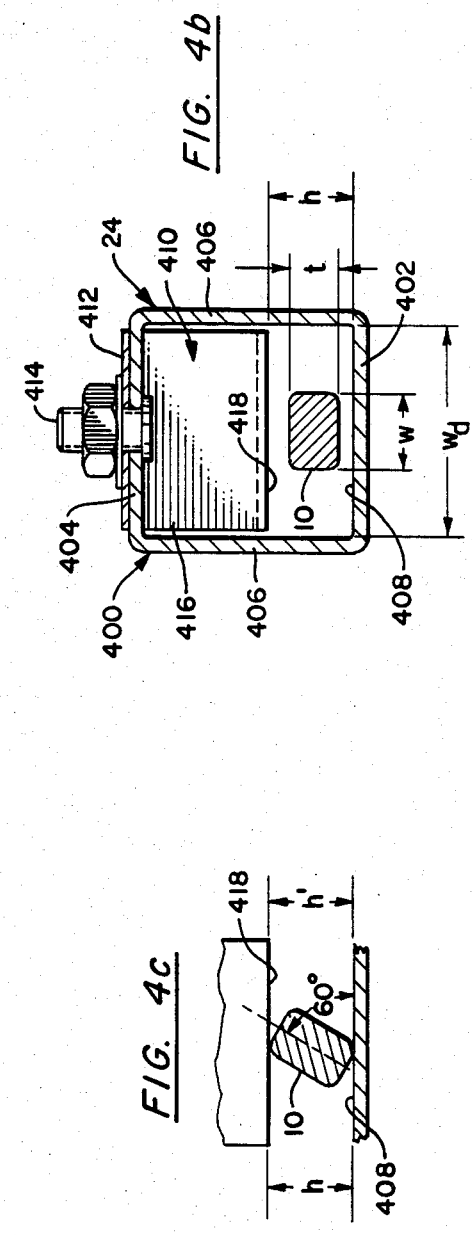
FIG. 4a
FIG. 4b
FIG. 4c

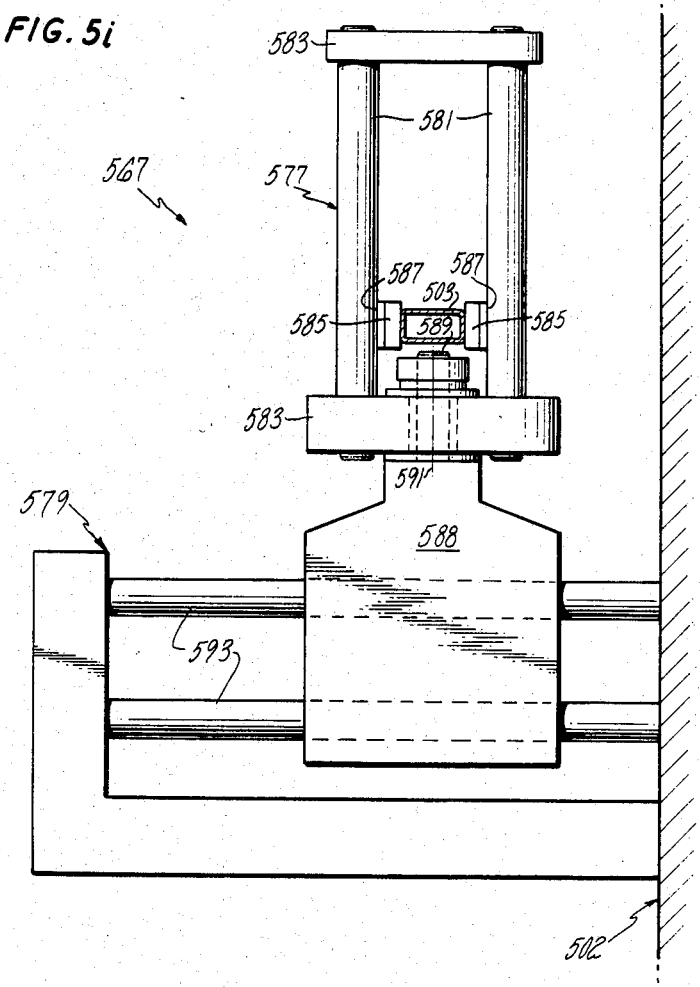

HIGH SPEED WIRE CUTTER

TECHNICAL FIELD

The present invention relates to an apparatus for cutting wire, and more particularly, to an apparatus for continuously cutting a length of wire moving at a high speed.

BACKGROUND ART

It is common in the wire manufacturing industry to produce a continuous length of wire which is cut into segments having desired, shorter lengths, and which are then coiled into a convenient packaging form. It is known in the art how to cut and coil wire in individually distinct and separate process steps. However, it is not known how to cut a length of moving wire into a succession of wire segments without interrupting the movement of the wire or the segments, and then, in the same continuous process sequence, coil these wire segments while they travel downstream at the same speed. The inability to combine these two steps into one continuous step results in significant costs which are incurred when the wire segments are separately moved from the cutter to the coiler.

U.S. Pat. No. 1,304,034 shows an apparatus which continuously cuts a length of moving wire into wire segments. However, this apparatus is not designed for high speed automated cutting of wire, since it requires manual operation to engage the cutting surfaces to sever the wire. The wire must be moving slow enough so that an operator will know when to cut the wire; even then, the wire segments which are cut may not have the precise lengths desired. Additionally, continual sliding contact between several components of this machine during the cutting operation may result in early wear, which may decrease the operating efficiency and accuracy of the cutter. Other U.S. patents of more general interest as regards the state of the art in wire cutting are: U.S. Pat. Nos. 2,401,639, 2,541,948, 3,057,239, 3,561,311, 3,477,326 and 4,065,992.

In a continuous wire fabrication operation, it is common to divert successive segments of wire to duplicate machines at different work stations. This allows one machine to perform its function on one segment of wire while the next segment of wire is diverted to another machine. See U.S. Pat. Nos. 2,126,528, 2,947,755, 3,223,345, 3,704,839, and 3,941,329. A common feature of the apparatus used to divert wire is a first wire pathway which is moved to direct successive wire segments through alternate, diverging second wire pathways which then direct the wire to different work stations. The position of the first wire pathway with respect to each of the second wire pathways must be maintained until the tail end of a moving wire segment has passed completely out of the first wire pathway and passed into the second wire pathway. A switching mechanism then moves the first wire pathway into another position, to direct the next wire segment through a different second wire pathway. The tail end of one wire segment must be spaced from the lead end of the next wire segment a distance which corresponds to the time it takes the first wire pathway to move to its next position. This space between wire segments may be created by stopping the movement of the wire briefly after each segment is cut, or, the segments may be held and then released at the proper time to obtain the correct separation distance. Regardless of the relative switching speeds and wire speeds, the first wire pathway must be moved to its respective position with precisely timed accuracy in order to avoid directing the wire into the wrong pathway, and to prevent wire jams in the diverter apparatus. Any error in the switching operation can result in significant system downtime.

One method for transporting wire from one work station to another, such as from a cutter to a coiler, is to push the wire through ducts located between each work station. However, when pushing wire through these ducts, the wire has a tendency to buckle in the duct. Alternatively, frictional forces between the wire and the duct may either slow the movement of the wire, or cause it to become wedged in the duct so that it cannot move. Also, the wire may become damaged from excessive scraping against the inside surface of the duct as it travels through it. Various means have been devised to improve the ability to transport wire through these ducts. In U.S. Pat. No. 3,176,538, a self-lubricating polymeric material such as Teflon ® is applied to the inside diameter of the duct and to the outside diameter of the wire being pushed through the duct to minimize friction between the wire and duct. In U.S. Pat. No. 4,426,046, a system of planetary roller drive mechanisms support the wire while it is pushed through the duct. This system imparts a roller-induced vibration to the wire, which drives the wire through the duct. However, such a vibrating system may damage the wire while it moves through the duct. Also, the system may be subject to downtime due to mechanical failure. Other U.S. patents which indicate the general state of the art in the field of wire transport are U.S. Pat. No. 4,196,333 and 4,265,025.

Machines for winding lengths of wire or strip material into coils are well known in the art. In general these coilers have a mandrel, rotated by a dedicated motor, onto which the wire is wound. Various means have been devised to attach the lead end of the moving wire to the mandrel at the start of the coiling process. These means commonly utilize endless belts which move around pulleys and partially surround the rotating mandrel, as shown in U.S. Pat. Nos. 2,890,003, 3,315,510, 3,328,991, 3,344,638, 3,423,981, and 3,988,916. The wire lead end is directed between the mandrel and the belt, and is captured therebetween; the coiling process begins as the mandrel is rotated. In some coilers, the endless belt is stationary and the mandrel is rotated as the lead end of the wire is fed between the belt and the mandrel. The friction between the incoming wire and the belt propels the belt into motion. To avoid buckling in these prior art coilers, the initial wire speed and the mandrel speed must be slow until the belt is accelerated to a speed which matches the speed of the wire. Once the wire lead end has attached to the mandrel, the wire is firmly held in place and forced to conform to the shape of the mandrel due to pressure exerted on the wire by the belt. To maintain a constant coiling rate, speed reduction means may be required to continually adjust the angular speed of the mandrel during the coiling process.

After the lead end is attached, and a number of wraps of the wire have been made on the mandrel, the belt is pulled away from the mandrel. Wire which does not fully plastically deform around the mandrel may unwind after the belt is removed. Additionally, after the coiling operation is completed, the unattached tail end of the wire may "whip" around the mandrel as the rotation of the mandrel is stopped. To prevent any contact of the whipping tail end with the surroundings, the coiling apparatus must be shielded.

If the wire is stopped or slowed down at any step in the complete wire cutting and coiling operation, the efficiency of the operation is decreased. Also, if the wire is damaged, it must be discarded, which also decreases efficiency. Therefore, in order to maximize production efficiencies in a high speed wire cutting and coiling operation, it is required that the wire move continuously, without being damaged, and at a constant high speed through each process step and from one process step to the next. While it is known how to cut and coil wire, prior art cutting and coiling apparatus cannot meet these operating requirements.

DISCLOSURE OF THE INVENTION

One object of the present invention is an improved apparatus for cutting a length of wire into wire segments.

Yet another object of the present invention is an improved apparatus for cutting a length of wire, moving at a high speed, into wire segments which have a predetermined length, without decreasing the speed of the wire.

In accordance with the present invention, each of a pair of adjacent knife carriers, each carrying a blade having a cutting edge, is disposed on an eccentric portion of a shaft which may be coupled to a drive shaft, each knife carrier rotating about the center of the eccentric when the shafts are uncoupled such that the cutting edge of each carrier reciprocates substantially radially with respect to the axis of the drive shaft as the carriers rotate and meet when both cutting edges are at their maximum radial extent to cut a moving wire passing between them, wherein a coupler is provided to couple the shafts when the cutting edges are at less than their maximum radial extent, such that the cutting edges rotate about the axis of the drive shaft without radial movement, and do not cut the wire. The shafts are coupled and uncoupled at appropriate intervals to cut the wire into segments having a desired length.

One advantage of the present invention is that the shaft speed may be selected such that during the cutting mode of operation, when the cutting edges meet and cut the wire, the tangential speed of the cutting edges is equal to the linear speed of the wire. As a result, the cutting edges do not scrape the wire surface, and it is not required to decrease the speed of the wire during the cutting operation.

The term "wire" as used in this specification and appended claims is intended to mean all forms of wire or cable of any cross sectional shape, including but not limited to metallic and nonmetallic, or sheathed and unsheathed.

This invention is particularly well suited for use in a nonstop, high speed operation for cutting a continuous length of wire into segments, and automatically forming these segments into coils. Such an operation, and apparatus associated with it, is shown and described in the present application, and in the following related applications which are commonly owned and copending with the present application: :"Process and Apparatus for High Speed Cutting and Coiling of Wire", C. Pali, Ser. No. 729,599 filed on May 2, 1985; "Wire Diverter", C. R. Busch, Ser. No. 729,601 filed May 2, 1985; "Wire Transport Conduit", C. R. Busch, Ser. No. 729,600 filed May 2, 1985; and "High Speed Wire Coiler", C. Pali, Ser. No. 729,604 filed May 2, 1985.

The foregoing features and advantages of the present invention will become more apparent in the light of the following detailed description of the best mode for carrying out the invention, and in the accompanying drawing.

BRIEF DESCRIPTION OF THE DRAWING

FIG. 1 is a simplified front view of a wire cutting and coiling apparatus incorporating a cutter of the present invention;

FIG. 2b is a cross sectional view, partly broken away, of the cutter of the present invention taken along lines 2b–2b of FIG. 2a;

FIG. 2e is an enlarged, schematic view of the cutting edges during the cutting mode of operation;

FIG. 4a is a front view, partly broken away, of a wire delivery conduit;

FIG. 4b is a cross sectional view of the wire delivery conduit;

FIG. 4c is a schematic view, showing the orientation of the wire within the delivery conduit;

FIG. 5h is a view generally taken along the line 5h–5h of 5a; and

FIG. 5i is a view generally taken along the line 5i–5i of FIG. 5a.

BEST MODE FOR CARRYING OUT THE INVENTION

Figure 2A:
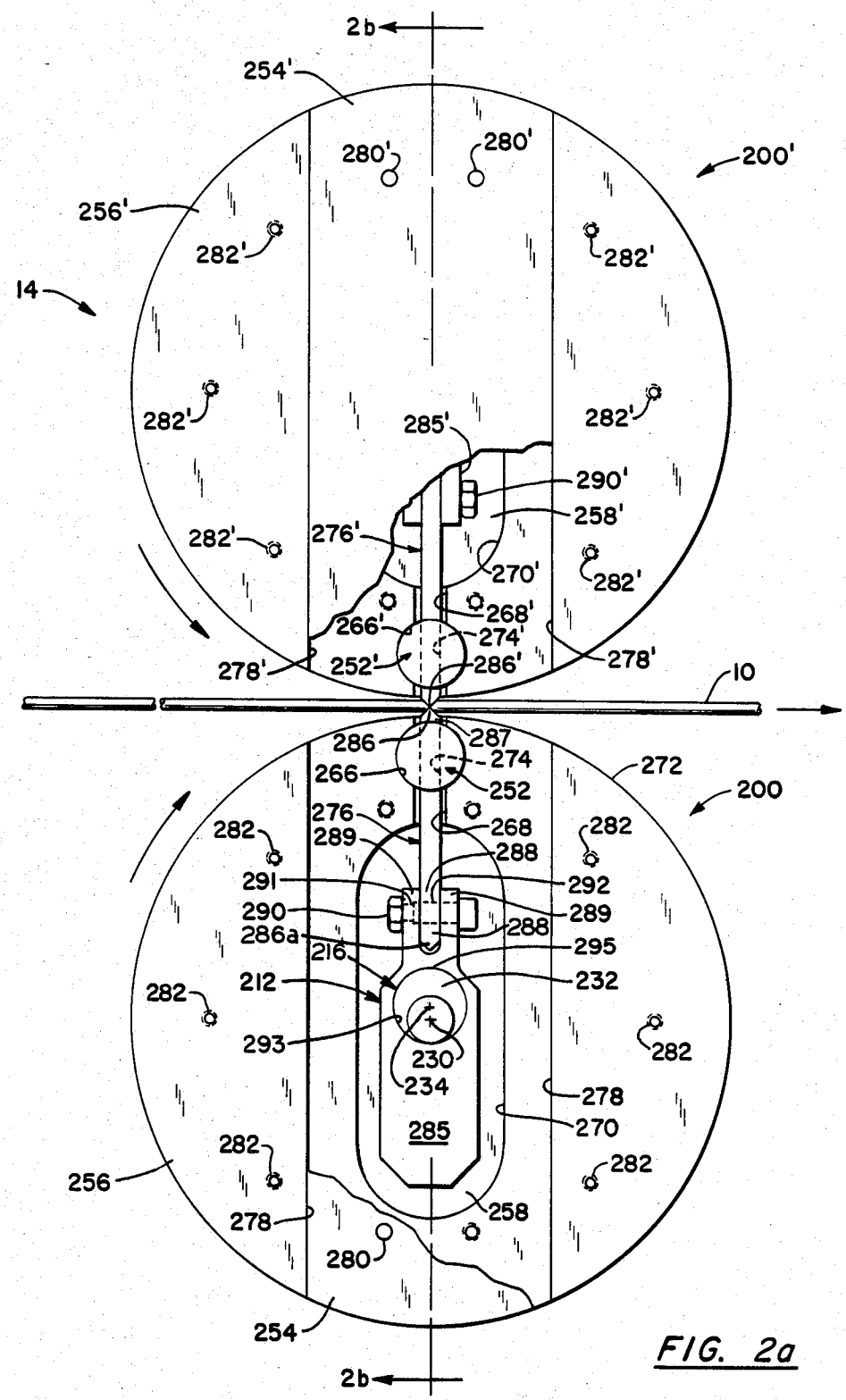
FIG. 2a is a front view, partly broken away and partly in section, taken along the lines 2a–2a of FIG. 2b, showing the cutter of the present invention in a cutting mode of operation.

Referring to FIG. 1, apparatus for cutting and coiling a substantially continuous length of wire 10 is generally represented by the reference numeral 2. The apparatus includes a cutter of the present invention 14, a diverter 16, wire transport conduits 24, 25, and coilers 26, 27, all of which are described in great detail below.

The wire 10, from a source 12, is pushed by rotating capstans 13 through the cutter 14; the wire 10 is guided into the cutter 14 by rollers 15. The cutter 14 is automatically programmed to operate alternately in a cutting mode and a non-cutting mode as the wire 10 moves therethrough, so as to cut a series of wire segments having a desired length. The transition from the cutting to the non-cutting mode of operation, and vice versa, takes place without affecting the downstream speed of the wire 10. Since the speed of the wire 10 is not affected as it passes through the cutter 14, the tail end of one wire segment immediately precedes the lead end of a next wire segment.

After passing through the cutter 14, the wires move immediately into the wire diverter 16. A first wire carrier 18 of the diverter 16 moves at appropriately timed intervals to direct the lead end of each successive wire through alternate wire pathways 314a, 314b, and into alternate transport conduits 24, 25. The successive wires move through the diverter 16 without any decrease in speed.

When the wires pass from the diverter 16, they are pushed by capstans 23 into and through the transport conduits 24, 25. The wires move through the conduits 24, 25 at a constant speed, and are prevented from buckling or twisting therein by the unique conduit design, as further described hereinbelow. The conduits 24, 25 carry the wires to respective nozzles 510, 511 at the downstream ends of the conduits. The nozzles 510, 511 direct the wires to the coilers 26, 27, respectively.

When the lead end of a wire reaches one of the coilers 26, 27, the wire immediately begins to be wound into a coil form 544 on a mandrel 508 of such coiler. The winding process takes place at a constant rate; when the wire segment is completely wound, it is automatically removed from the coiler, and deposited in a container.

As a result of the operation of the apparatus 2 hereinabove described, as one of the coilers 26, 27 is coiling a wire segment, the next wire segment is moving toward the other coiler; this alternating mode of operation continues until a desired number of segments have been cut and formed into coils.

Having briefly reviewed the operation of the wire cutting and coiling apparatus 2, further details of each individual piece of apparatus will now be further described.

High Speed Wire Cutter

Figure 2B:
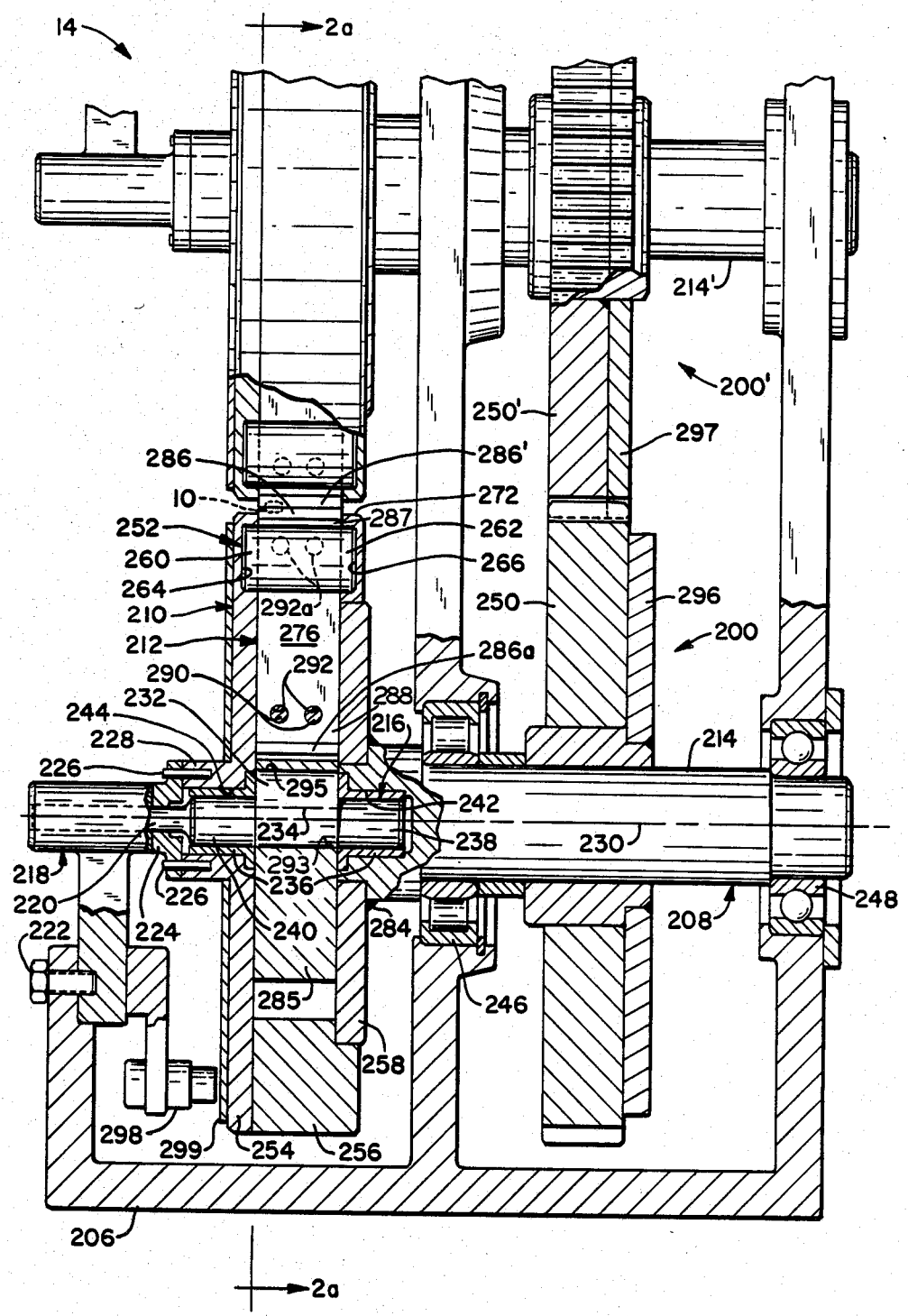

The FIGS. 2a thru 2e show an exemplary embodiment of the cutter 14. Referring first to FIGS. 2a and 2b, the cutter 14 includes a lower assembly 200 and an upper assembly 200', which are essentially mirror images of each other, and which are secured, by means to be described, to a support structure 206. The details of the cutter 14 will be described with respect to the lower assembly 200. In the drawing, parts of the upper assembly which correspond to parts of the lower assembly are given the same, but primed, reference numerals.

The assembly 200 comprises a drive assembly 208, a rotator assembly 210, and a blade assembly 212. The drive assembly 208 includes a drive shaft 214, a carrier shaft 216, and a coupler 218. A motor (not shown) is connected to and rotates the drive shaft 214. The rotator assembly 210 is secured to and rotates with the drive shaft 214, as is explained further below. The blade assembly 212 is disposed on the carrier shaft 216 and is connected to the rotator assembly 210 for rotation therewith at the speed of the drive shaft 214. An elongated end 220 of the carrier shaft 216 extends into the coupler 218, which is attached to the support 206 by bolts 222 or other suitable means. A rotatable end 224 of the coupler 218 is fixedly attached by pins 226 to a hub 228 of the rotator assembly 210, for rotation therewith.

The carrier shaft 216 is coaxial with the drive shaft 214, which has an axis of rotation 230. The carrier shaft 216 has an eccentric 232 which has a center 234 offset from the axis 230. The carrier shaft 216 includes a journal bearing 236 on each of its ends 238, 240. One of the bearings 236 is disposed within a bore 242 of the drive shaft 214; the other bearing 236 is disposed within a bore 244 in the hub 228 of the rotator assembly 210. The drive shaft 214 is supported from the structure 206 by spaced apart bearings 246, 248. Disposed on the drive shaft 214 is a drive gear 250, which engages an identical drive gear 250', disposed on the drive shaft 214' to rotate the shaft 214'.

Figure 2C:
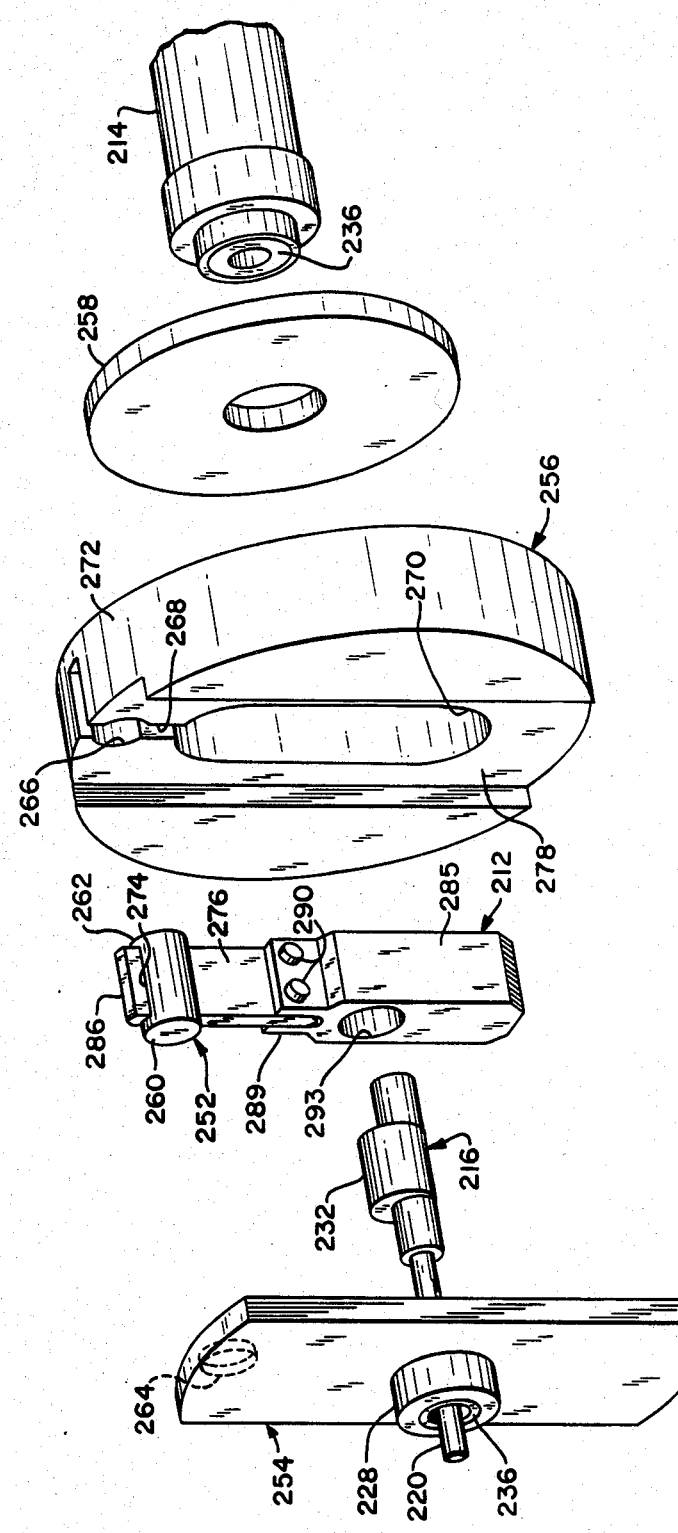
FIG. 2c is a simplified, exploded view of a lower assembly of the cutter of the present invention.

The rotator assembly 210 includes a cylindrical blade guide 252, a front plate 254, a knife wheel 256, and a rear plate 258. As is shown in FIGS. 2b and 2c, the ends 260, 262 of the blade guide 252 are located in opposed recesses 264, 266 in the front plate and knife wheel 254, 256, respectively. A slot 268 extends radially from an elliptically shaped cut-out 270 in the knife wheel 256 to the rim 272 of the knife wheel 256. The blade guide 252 includes a slot 274 therethrough, and a knife blade 276 is slidably disposed within the slot 274. The slot 274 is precisely located and sized to accurately position the knife blade 276 as it cuts the wire 10. Rotation of the blade guide 252 within the recesses 264, 266 allows for non-radial orientation of the knife blade 276 relative to the axis 230 as the blade assembly 212 rotates about the eccentric portion center 234 as will be discussed later.

Referring also to FIG. 2a, the knife wheel 256 has a cavity 278 therein. The elliptically shaped cut-out 270 extends through the cavity 278, and the blade assembly 212 is trapped in the cut-out 270 by the front and rear plates 254, 258, respectively. The front plate 254 is positioned within the cavity 278 and is attached thereto by the bolts 280, one of which is shown in the Figure. The rear plate 258 is attached to the knife wheel 256 by the bolts 282, and is circumferentially welded at 284 to the drive shaft 214. Therefore, when the motor turns the drive shaft 214, the rotator assembly 210 and the blade assembly 212 trapped therein rotate with the same angular velocity as the drive shaft 214.

As is shown in FIGS. 2b and 2c, the hub 228 is integral with the front plate 254. The rotatable end 224 of the coupler 218 is secured to the hub 228 by the pins 226. The end 224 is interconnected to internal components (not shown) of the coupler 218 which, upon receiving an appropriate signal, couple the rotatable end 224 to the elongated end 220 of the carrier shaft 216. In this manner, the carrier shaft 216 is coupled to the rotator assembly 210, and, therefore, to the drive shaft 214; when the drive shaft 214 is rotated, the carrier shaft 216 rotates with the drive shaft 214, and with the same angular velocity. Similarly, upon receiving an appropriate signal, the coupler 218 uncouples the carrier shaft 216 from the drive shaft 214, and holds the carrier shaft 216 stationary while the drive shaft 214 continues to rotate.

Referring to FIG. 2a, the blade assembly 212 includes a knife carrier 285 and the knife blade 276. The knife blade 276 has a cutting edge 286 at its outer end 287. The blade 276 is attached at its inner end 288 between lugs 289 on the knife carrier 285. The blade 276 is secured to the carrier 285 by the bolts 290 which pass through appropriately located holes 291 in the lugs 289 and holes 292 in the blade 276. The knife carrier 285 has a bore 293 therethrough and the eccentric 232 is disposed within the bore 293. The eccentric 232 acts as a cam, and the surface of the bore 293 acts as a cam follower, as is described below.

When the carrier shaft 216 and the drive shaft 214 are not coupled by the coupler 218, the drive shaft 214 rotates while the carrier shaft 216 is stationary, and the cutter 14 operates in a cutting mode. During the cutting mode of operation, the cam following surface of the bore 293 rotates on the cam surface of the eccentric 232 so that the knife carrier 285 rotates about the center 234 of the eccentric portion 232, and the cutting edge 286 moves in a substantially radial direction with respect to the shaft axis 230 in reciprocal fashion. While FIG. 2b shows the blade assembly 212 in close juxtaposition with the front plate 254, rear plate 258, and the slots 268, 274, there is sufficient clearance to permit the reciprocal movement therein.

In order for cutting edges 286, 286' to be in a position to cut the wire 10 during a revolution of the rotator assembly 210, the coupler 218 uncouples the carrier shaft 216 from the drive shaft 214 and simultaneously stops the carrier shaft 216 so the eccentric 232 is oriented to cause the cutting edge 286 to be at its maximum radial extent and to meet the similarly rotating cutting edge 286' as they move past each other.

Figure 2D:
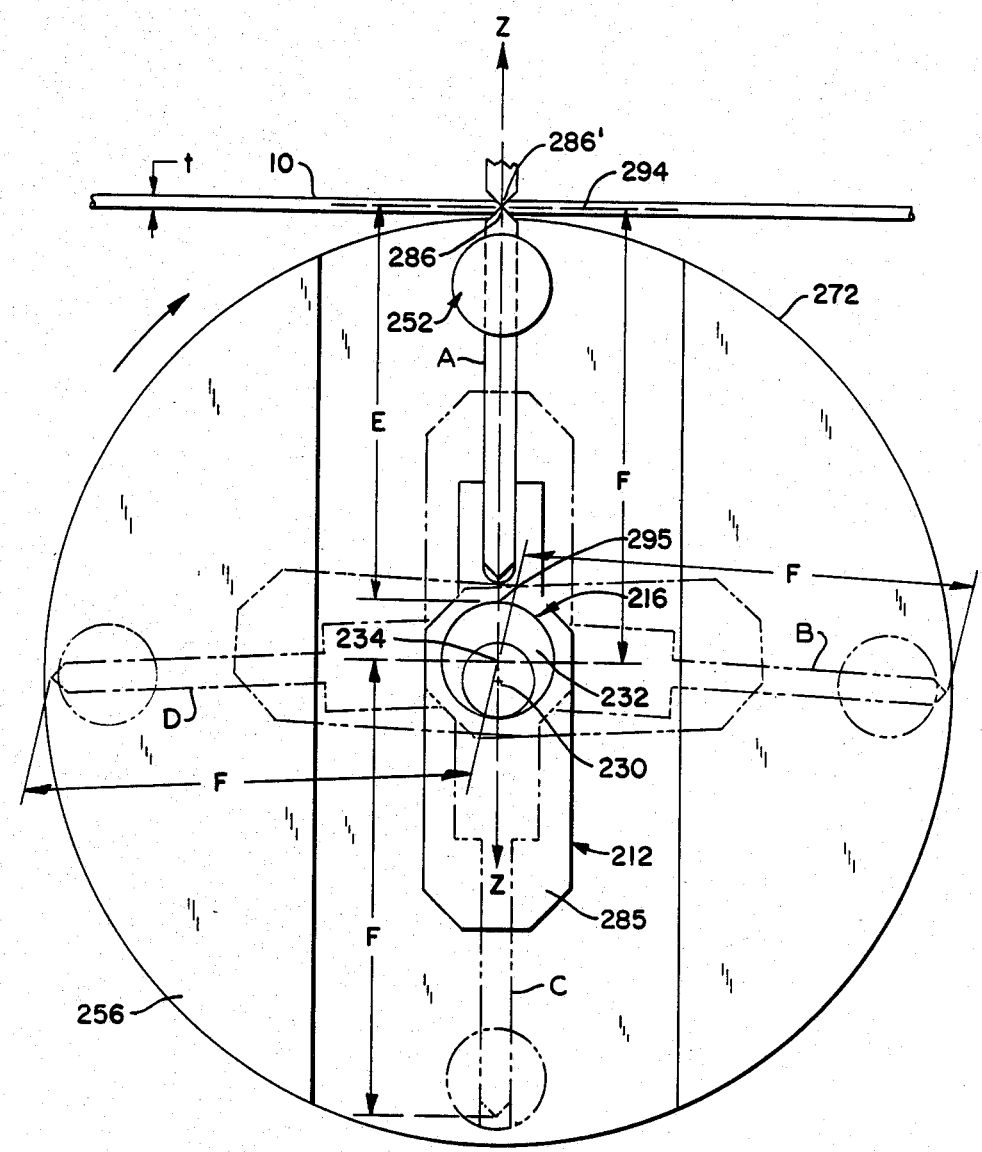
FIG. 2d is an illustrative view showing the lower assembly of the cutter in several positions during a cutting mode of operation.

More specifically, the FIG. 2d shows four positions (A, B, C, D) of the blade assembly 212 during the cutting mode of operation, as it rotates about the eccentric center 234; the cutting edge 286 rotates at a constant distance F from the center 234, and reciprocates with respect to the drive shaft axis 230. The blade assembly 212 and the knife wheel 256 are constructed and arranged such that the cutting edge 286 is at its maximum radial extent at position A. In position A, the brake mechanism in the coupler (not shown) has stopped the carrier shaft 216 so the perpendicular distance E measured between the midpoint 294 of the wire 10 and the high point 295 on the eccentric 232 is at its minimum value. When the carrier shaft 216 is stopped in this position, the eccentric high point 295 will lie on a radial line (denoted Z—Z) through the drive shaft axis 230 and perpendicular to the wire 10. When the cutting edge 286 is at its maximum radial extent, it extends past the rim 272 of the knife wheel 256, and penetrates one half of the thickness t of the moving wire 10. Since the cutting edge 286 penetrates one half of the wire thickness t, and the cutting edge 286' penetrates the other half of the wire thickness t, the wire 10 is completely severed when the cutting edges 286, 286' meet.

As is shown in FIG. 2b, a phase adjustment plate 296 is attached to the drive gear 250. The plate 296 allows the drive shafts 214, 214' to be rotated independently of each other during assembly of the cutter 14. This rotation permits the cutting edge 286 to be positioned during assembly in exact alignment with the cutting edge 286' so that when the edges meet, the wire 10 will be completely severed during the cutting mode of operation. An anti-backlash gear 297 is attached to the drive gear 250' and engages the gear 250. The gear 297 eliminates backlash between the drive gears 250, 250', thereby also maintaining alignment of the cutting edges 286, 286'.

When the cutting edge 286 cuts the wire 10, the motor is rotating the drive shaft 214 such that the tangential speed and direction of movement of the cutting edge 286 is substantially the same as the speed and direction of the wire 10. In this exemplary embodiment, the speed of the motor is electronically synchronized with the speed of the wire 10. It is preferred that the difference between the tangential speed of the cutting edge 286, as it cuts the wire 10, and the linear speed of the wire 10 is within about 0.1% of the wire speed. In this desired range, the cutting edges 286, 286' do not drag on or scrape the wire surface, and there is no need to decrease the speed of the wire 10 during the cutting mode of operation.

In the non-cutting mode of operation, the carrier shaft 216 and the drive shaft 214 are coupled for rotation by the coupler 218. During the non-cutting mode, the knife carrier 285, carrier shaft 216, and drive shaft 214 rotate as one piece, about the shaft axis 230. The cutting edge 286 therefore does not reciprocate with respect to the axis 230, as it does during the cutting mode of operation. The carrier shaft 216 is coupled to the drive shaft 214 when the cutting edge 286 is sufficiently close to the axis 230 so the cutting edge 286 cannot touch the wire 10 as it rotates. With reference to FIG. 2d, it is seen that the cutting edge 286 does not extend past the rim 272 of the knife wheel 256 as the blade assembly 212 moves from position B to D. If the carrier shaft 216 is coupled to the drive shaft 214 within this range of positions, the cutting edge 286 will not cut or touch the wire 10 while the blade assembly 212 rotates.

The cutter 14 operates in the non-cutting mode until a predetermined length of the wire 10 has passed therethrough. Preferably, the linear speed of the wire 10 and the angular speed of the motor are kept constant. Therefore, each revolution of the rotator assembly 210 corresponds to the passage of a known length of wire 10 through the cutter 14. A sensor 298, electrically connected to the coupler 218, counts the number of revolutions of the rotator assembly 210 by counting the number of revolutions of a sensor plate 299. The sensor plate 299 is attached by means not shown to the front plate 254. The sensor plate 299 has markers thereon, readable by the sensor 298, which indicate the exact angular position of the rotator assembly 210 as it rotates. If, during the non-cutting mode of operation, the desired length of the wire 10 will pass through the cutter 14 in "n" revolutions of the rotator assembly 210, the sensor 298 signals the coupler 218 on the $(n-1)^{th}$ revolution of the rotator assembly 210 to uncouple the carrier shaft 216 from the drive shaft 214 and to stop the carrier shaft 216 in a position which results in the cutting edges 286, 286' cutting the wire 10 on the next, or $n^{th}$ revolution. After the wire 10 has been cut, and before the rotator assembly 210 makes another complete revolution, the sensor 298, upon reading the appropriate marker on the plate 299, signals the coupler 218 to couple the carrier shaft 216 to the drive shaft 214 in the required position so that the cutter 14 operates in the non-cutting mode.

When the operating mode of the cutter 14 is changed from the cutting mode to the non-cutting mode, and vice versa, it is done "on the fly", i.e., while the rotator assembly 210 continues to rotate and while the wire 10 continues to pass through the cutter 14. To assure that the wire segments which are cut have the precise length desired, the transition from one operating mode to the other must be fast and accurate. A coupler 218 that has worked satisfactorily in the cutter of the present invention is model CB-4, S, CW, Mod. #10, 15 (AOR-ALS), ⅜", 24 VDC, from Warner Electric Brake & Clutch Co. (South Beloit, IL).

As shown in FIGS. 2a and 2b, the knife blade 276 includes cutting edges 286 and 286a, at its outer end and inner end, 287 and 288 respectively. When the cutting edge 286 becomes dull or damaged, the knife blade 276 can be turned around, and the bolts 290 inserted in the holes 292a to reattach the blade 276 to the knife carrier 285 so that the cutting edge 276a is used.

Referring to FIG. 2e, it is seen that the width $w_c$ of the cutting edge 286 is about three times greater than the width w of the wire 10. If one portion $w_p$ of the cutting edge breaks or becomes too dull, another portion of the edge 286 can be selected to cut the wire, merely by adjusting the guide rollers 15 (FIG. 1). The wire 10 is then directed into the cutter 14 so that a different portion of the edge 286 cuts the wire 10. Preferably, the cutting edge width $w_c$ is at least two times the width w of the wire 10, in order to have at least four (two on each end of the blade) different cutting edge portions $w_p$ on each blade.

Wire Diverter

Figure 3A:
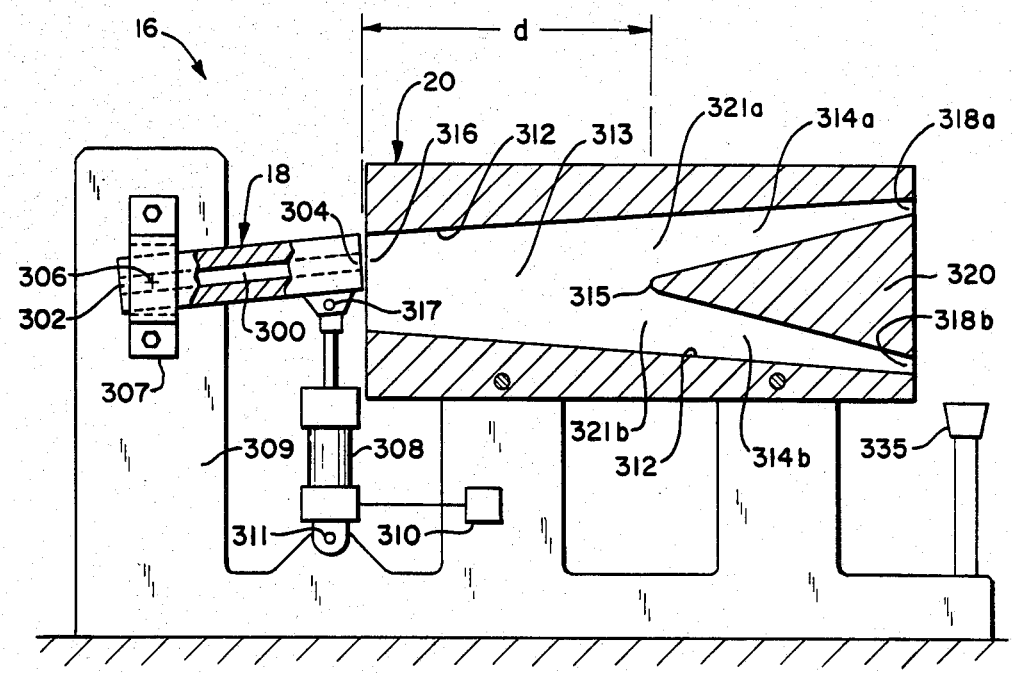
FIG. 3a is a simplified view, partly in section, showing wire diverter.

The FIGS. 3a thru 3g show an exemplary embodiment of the diverter unit 16. Referring to FIG. 3a, the unit 16 comprises a first wire carrier 18 arranged in series with a second wire carrier 20. The first wire carrier 18 includes a first wire pathway 300 which has an inlet end 302 and an outlet end 304. The first wire carrier 18 is pivotally connected upstream of the outlet end 304 to a bracket 307 by means not shown. The bracket 307 is fixedly secured to a support 309. The pivotal connection of the carrier 18 to the bracket 307 allows the carrier to rotate about an axis 306 perpendicular to the plane of the drawing. A pneumatic actuator 308, operated by a control 310, is pivotally secured to the support 309 at 311, and to the carrier 18 at 317. The second wire carrier 20, fixed to the support 309, includes walls 312 defining a channel 313 having an entrance 316. The entrance 316 is closely spaced from the outlet end 304 of the first wire pathway 300. A wedge shaped divider 320, spaced a distance d downstream from the first wire pathway outlet end 304, divides the channel 313 into two separate, second wire pathways 314a, 314b, arranged in parallel. The second wire pathways 314a, 314b diverge from the common point 315, and have inlet ends 321a, 321b, respectively, and outlet ends 318a, 318b, respectively.

Referring now to FIGS. 3b-3f, the operation of diverter is as follows:

Wire is continuously fed at a high speed from the cutter 14 through the pathway 300 such that the tail end of each segment immediately precedes the lead end of the next segment. Movement of the segments is continuous and typically at a constant speed. In FIG. 3b, the pathway 300 and its outlet end 304 are shown substantially aligned with the pathway 314a. The lead end 324 of a moving wire segment 322 is thus directed from the outlet end 304 into the inlet end 321a of the pathway 314a, as shown. (Note: the tail end of a wire segment is designated in FIGS. 3b-3f by a small circle, to distinguish it from the lead end of the next wire segment.) Before the tail end 326 of the wire segment 322 leaves the outlet end 304, the carrier 18 is pivoted about the axis 306 to its second position (FIG. 3c), which aligns the pathway 300 and its outlet end 304 with the other pathway 314b, such that the lead end 328 of the next wire segment 330 is directed into the pathway 314b, as shown in FIG. 3d. Referring back to FIG. 3c, the wire segment 322 bends into an "S" shape after the pathway 300 has been moved. The distance d between the outlet end 304 and the inlet ends 321a, 321b must be sufficient to assure continued smooth movement of the wire segment in all operating positions of the apparatus. The distance d is selected to prevent unacceptable bending of the wire segments to accomodate the misalignment between the pathway 300 and the pathways 314a, 314b, as the case may be. It is apparent that too sharp a bend may cause the wire segments to become jammed within the carrier 20.

Figure 3G:
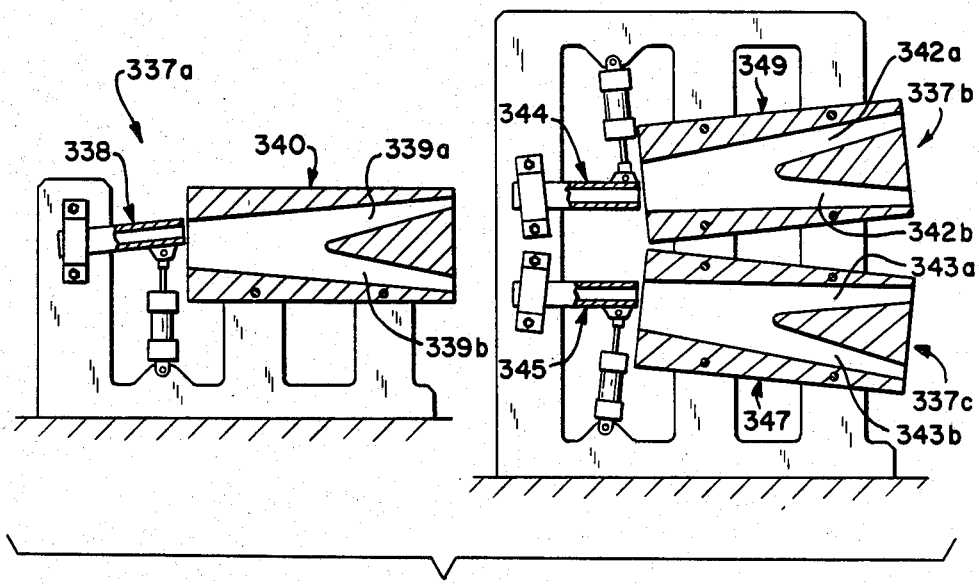
FIG. 3g is a simplified view, partly in section, showing a plurality of wire diverters in one possible arrangement.
Figure 3B:
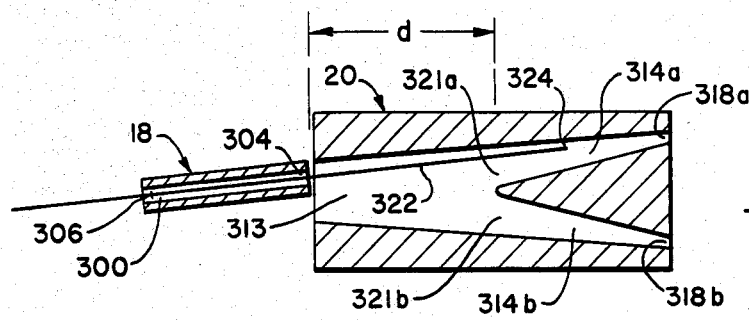
FIGS. 3b–3f are a series of simplified, cross sectional views illustrating a complete cycle of operation of the wire diverter.
Figure 3C:
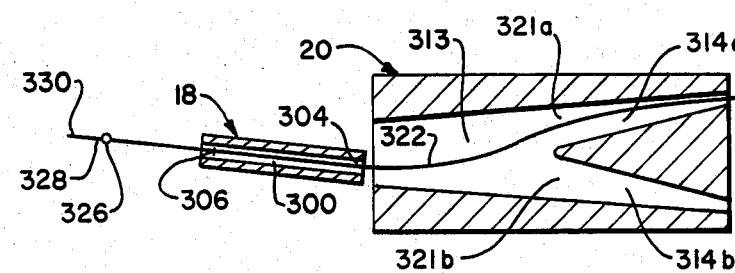
Figure 3D:
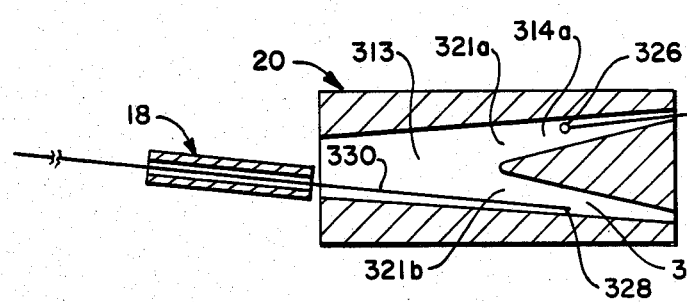
Figure 3E:
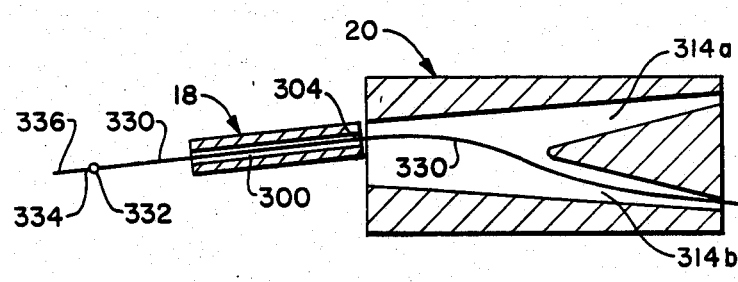
Figure 3F:
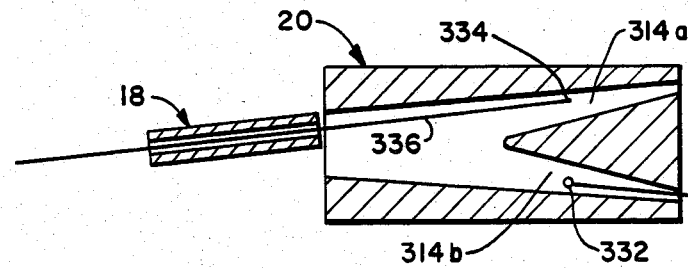

As shown in FIGS. 3e and 3f, before the tail end 332 of the wire segment 330 leaves the outlet end 304 of the pathway 300, the carrier 18 is pivoted into position to direct the lead end 334 of the next wire segment 336 into the pathway 314a. Again, the wire segment 330 bends into the "S" shape to accomodate the misalignment between the pathways 300, 314b. It should be noted that the positions of the wires in FIG. 3f are the same as those shown in FIG. 3b. The FIGS. 3b-3f show the complete cycle of operation for an exemplary diverter unit 16. This operation is repeated until a desired number of wire segments have passed through the diverter 16 and into the transport conduits 24, 25 (FIG. 1).

A sensor 335 is positioned to monitor the passage of wire segment lead ends from the outlet ends 318a, 318b of the second wire pathways 314a, 314b, respectively. Upon detecting such passage, the sensor 335 sends a signal to the control 310, which upon receiving the signal, moves the actuator 308 so that the first wire carrier 18 directs the next segment of wire through the other second wire pathway.

Although in this exemplary embodiment, the carrier 20 has only two pathways 314a, 314b, it is apparent that the carrier 20 could have more than two pathways, all arranged in parallel relation. In such an apparatus, the carrier 18 would be scheduled to pivot through appropriate angles to direct the wire segments through the alternate pathways in any desired sequence.

From the foregoing description, it can be seen that no space is required between the tail end of one wire segment and the lead end of the next segment. Also, the successive wire segments move without interruption and at the same speed through the diverter 16. It should be noted, however, that the present invention will be equally useful for diverting a succession of wire segments in which the tail end of one segment and the lead end of the next segment are separated by a gap of any desired length.

The diverter 16 is especially well suited for directing each wire segment through a second wire pathway different from the one through which the preceding wire segment was diverted. In that case, the position of the first wire carrier 18 is moved one time for each passage of a wire segment through it. However, it may also be desired to direct successive wire segments into the same second wire pathway. In that operating mode, a set of wire segments would be directed through the first wire carrier 18 while the carrier 18 is held in a stationary position. When the last wire segment of the set has been directed into the second wire pathway, and before the tail end of the last segment has left the outlet end of the first wire pathway, the relative positions of the first and second wire pathways would be moved to direct the lead ends of the wire segments of the next set into a different one of the second wire pathways.

FIG. 3g shows a plurality of diverter units 337a, 337b, 337c in one possible arrangement, for diverting wire segments sequentially into four separate pathways. The unit 337a comprises a first pivoting carrier 338 and a second carrier 340. The carrier 340 has two pathways 339a, 339b. The unit 337b comprises a first pivoting carrier 344 and a second carrier 349 which has two pathways 342a, 342b. The unit 337c comprises a first carrier 345 and a second carrier 347 having two pathways 343a, 343b. While the operation of the diverters 337b, 337c is the same as described with respect to FIGS. 3b–3f, the operation of the diverter 337a is changed. The carrier 338 directs a set of at least two successive wire segments through the pathway 339a, which in turn directs them into the carrier 344 of the diverter unit 337b. The carrier 344 then diverts these wire segments into the pathways 342a, 342b, in the manner previously described. Before the tail end of the last wire segment of the set has passed from the first carrier 338, the carrier 338 pivots to its alternate position so that the next set of segments travel through the second wire pathway 339b, and are diverted into the pathways 343a, 343b, respectively, by the third carrier 345. A control (not shown) synchronizes the movement of the pivoting carriers 338, 344, 345.

It is apparent that the wire carriers 340, 347, 349 could have more than two pathways each; the pivoting wire carriers 338, 344, 345 would be scheduled to move in any sequence appropriate to the number of pathways and to the needs of the overall system in which the apparatus is used. For example, one or more of the wire pathways 342a, 342b, 343a, 343b may be retained for directing the wire segments to a wire receptacle other than a coiler, i.e., as a "safety path", for use only in special circumstances, e.g., to remove quality control specimens on a random basis, or to remove damaged or defective wire segments. The remaining pathways receive wire segments sequentially on a continuous basis. The operation of the control for the pivoting carriers 338, 344, 345 would be modified accordingly.

Returning to FIG. 3a, it should be recognized that the diverter 16 will work equally well if the first wire carrier 18 is fixed and the second wire carrier 20 is moved so that the first pathway 300 is aimed, sequentially, at alternate second pathways. It should additionally be noted that there could be a combination of movement of the first and second wire carriers 18, 20 to direct the wire segments through the desired second wire pathways.

A diverter unit similar to that shown in FIG. 3a was constructed and successfully diverted wire segments 250 feet long and travelling at 2,400 feet per minute with substantially no space between adjacent segments. The wire was insulated copper cable, #12-2G gauge, and had a cross section dimension of approximately 0.44×0.21 inches. The distance d was approximately 7⅜ inches.

Wire Transport Conduit

FIGS. 4a thru 4c show an exemplary embodiment of the wire transport conduit 24, which is identical to the conduit 25 shown in FIG. 1. The wire transport conduit 24 comprises a duct 400 which has a lower wall 402, an upper wall 404 and side walls 406. In FIG. 4a, the downstream direction of wire travel is from left to right. The lower wall 402 has an internal, flat bottom surface 408. A plurality of sheet metal fingers 410 are spaced along the length of the duct 400 above the bottom surface 408 and are attached to the upper wall 404 at the upstream end 412 of the finger 410 by the bolts 414 or other suitable means. Each finger 410 extends downstream, and has a central portion 416 and downstream end 418, both of which extend substantially across the internal width $w_d$ of the duct 400. To facilitate the installment or removal of the fingers 410 in the duct 400, a slot 420 is provided in the upper wall 404 of the duct 400. The fingers 410 are arranged close to the bottom surface 408 of the duct 400 in order to maintain the wire close to the bottom surface 408 as the wire 10 moves through the conduit 24. Each finger 410 is resiliently movable in a direction which is substantially perpendicular to the bottom surface 408 of the duct 400 when the wire 10 impacts the finger 410.

Each finger 410 extends from the upstream end 412 towards the downstream end 418 at an acute angle $\theta$ with respect to the bottom surface 408. In this exemplary embodiment, the downstream end 418, which is closest to the bottom surface 408, is parallel to the bottom surface 408 in order to provide a smooth surface, rather than a sharp edge, for the wire 10 to contact as it moves through the duct 400.

The finger 410 must be resilient so that when it is struck by the wire 10 moving through the duct 400, the finger 410 can initially move vertically away from the bottom surface 408, yet still exert a sufficient force on the wire 10 to maintain it near the bottom surface 408 of the duct 400. In order to keep the wire 10 moving through the duct 400 without interruption, it is necessary to keep the lead end 11 of the wire 10 moving in a substantially straight line path near the bottom surface 408 of in the duct 400.

If the wire 10 is not circular in cross section, it may have a tendency to twist as it travels through a duct, which may preclude subsequent processing of the wire 10. For example, flat wire, defined herein as wire whose cross sectional width w is greater than its thickness t, must be wound on the mandrels 508, 509 of the coilers 26, 27 (FIG. 1) such that the width w of the wire 10 lays flat on the surface of the mandrels 508, 509. If the wire 10 is directed into the coiler 26, 27 in a twisted condition, the coil will not be wound as required. The conduit 24 of the present invention prevents twisting of the flat wire 10 and allows the coiling operation to proceed without interruption. The conduit 24 will be useful in any similar processing where the orientation of the wire 10 must be controlled.

It has been determined that whether or not a flat wire 10 twists as it moves through the duct 400 depends upon the width w of the wire 10 and the distance h between the downstream end 418 of the finger 410 and the bottom surface 408 of the duct 400. The distance h must be less than the width w of the wire 10 but greater than the thickness t of the wire 10 to avoid excessive rubbing. Also, the spring rate of the fingers 410 must be chosen so that they will not be pushed too far away from the bottom surface 408 when contacted by the wire 10. If they were, the wire may twist as it travels through the conduit 400.

In a test of the wire transport conduit described above, insulated copper cable, #12-2G gauge, (which has a width w of 0.44 inch and a thickness t of 0.21 inch) was pushed through a 40 foot length of square steel duct having internal dimensions of ⅞×⅞ inch. Fingers 410 were fabricated from SAE - 1095 spring steel strip, 1/16 inch thick and ¾ inch wide, heat treated to a "blue" steel spring quality. The upstream end 412 of the fingers 410 was approximately one inch in length, the central portion 416 was approximately three inches in length, and the downstream end 418 was approximately ¾ inch in length and disposed parallel to the duct bottom surface 408. The upstream end 412 of each finger 410 was attached to the upper wall 404 of the duct 400 and was centered between the side walls 406. Each finger 410 extended downstream from the upper wall 404 toward the lower wall 402, and extended substantially across the width, $w_d$ of the duct 400. The central portion 416 of each finger 410 was disposed at an acute angle $\theta$ of about 13.5° with respect to the bottom surface 408. The vertical distance h between the bottom surface 408 and the downstream end 418 was approximately 3/8 inch. The linear distance between successive fingers was 24 inches.

A 250 foot length of flat #12-2G copper wire was pushed through the above described wire transport conduit 24 at a linear speed of 2,400 feet per minute, and exited undamaged, and still moving at the same speed. The wire did not buckle or jam while it moved through the duct 400. The dimensions and orientation of the fingers 410 within the duct 400 allowed the wire to twist a maximum of about 60° within the duct 400 before contacting the fingers 404. In other words, when the wire rotated approximately 60° about its longitudinal axis of symmetry, its projected vertical height, h', was equal to the distance between the bottom surface 408 and the downstream end 418 of the finger 410 (FIG. 4c).

Further tests were conducted with the #12-2G copper wire, which indicated that when the angle $\theta$ between the central portion 416 of each finger 410 and the bottom surface 408 of the duct 400 was greater than about 15°, the wire buckled when it struck the fingers. If the size of fingers 410 is kept constant, and the angle $\theta$ is less than about 12°, it is believed that the wire is also likely to buckle as it travels through the duct, since the distance h between the downstream 418 and the bottom surface 408 would be too great; also, the wire would probably easily twist. Tests also indicated that if the spring rate of the fingers 410 is too high, the fingers 410 will act like a stationary wall, and when struck by the wire 10 are likely to cause the wire 10 to buckle. When the fingers 410 were separated from each other by a linear distance of more than about 24 inches, the wire either buckled or jammed in the duct 400. Also, the wire was able to twist unacceptably as it moved through the duct 400. When the linear distance between the finger 410 was less than about 24 inches, the wire moved without problems through the duct 400. However, moving the fingers 410 too close together is likely to result in excessive rubbing of the wire by the fingers 410.

Tests were conducted to evaluate the wire carrying capabilities of fingerless ducts. The ⅝×⅞ inch ducts previously described, and ducts having other cross section dimensions were tested. However, the wire buckled and became jammed when it was pushed through all of the fingerless ducts, regardless of their size.

Wire Coiler

FIGS. 5a thru 5i show an exemplary embodiment of the coiler 26, which is identical to the coiler 27 as shown in FIG. 1. Some of the components of the coiler 26 are moveable. In FIGS. 5b thru 5e, phantom lines indicate the position of the moving components in the immediately preceding Figure.

Figure 5A:
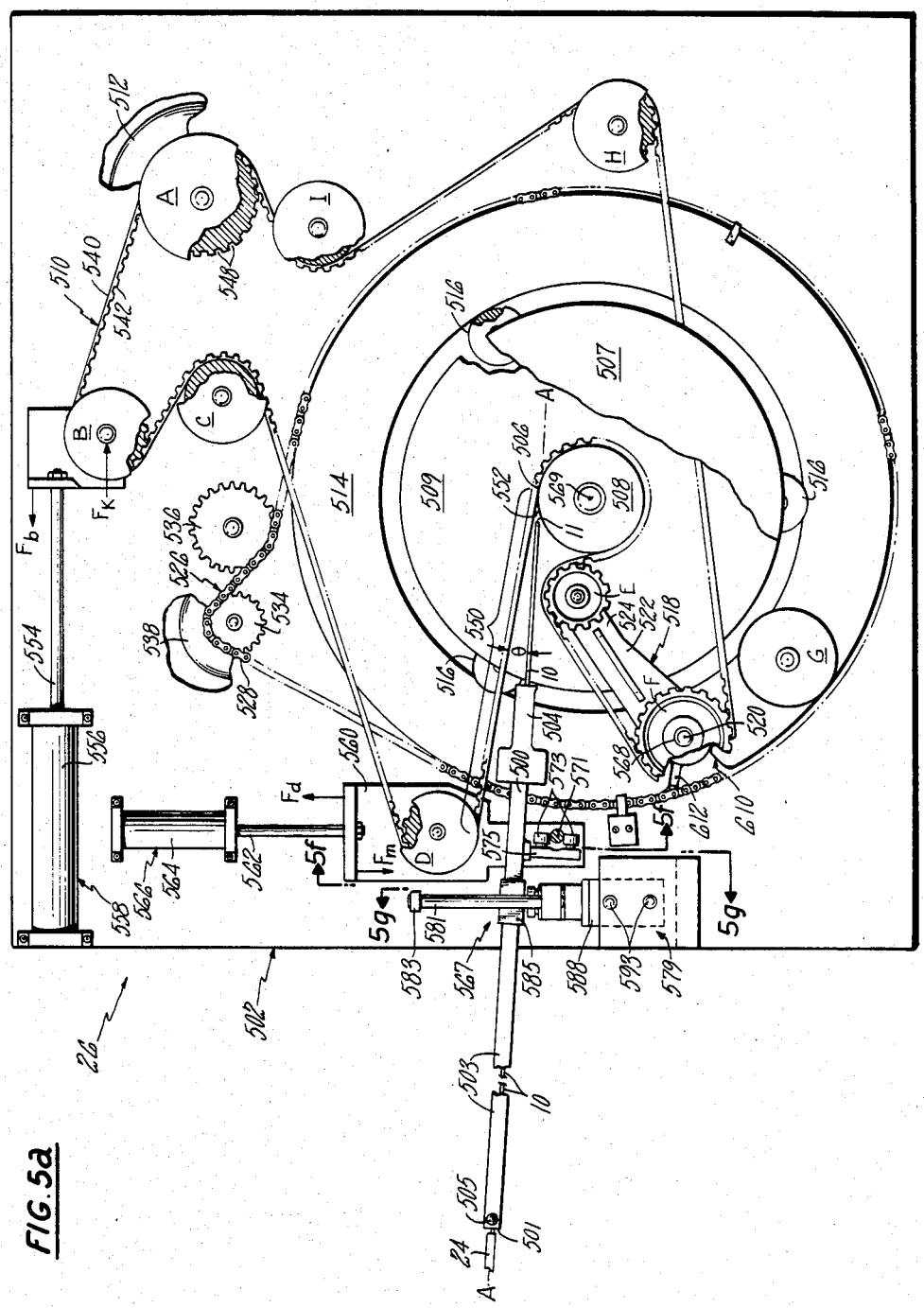
FIG. 5a is a front view, partly broken away, showing a coiler at the start of the winding process.

Referring to FIG. 5a, the coiler 26 is shown at the beginning of a coiling cycle, and is secured to a support structure 502 by means not shown. The coiler 26 includes a wire delivery tube 503 and a delivery nozzle 504 at the tube outlet end 500. The tube 503 is pivotable in both a horizontal and vertical plane, about a point 505 just downstream of the tube inlet end 501. The wire 10 passes from the delivery conduit 24 (FIG. 1) directly into the tube inlet end 501, and the nozzle 504 directs the wire 10 onto the outer surface 506 of a free wheeling mandrel 508. Cover plates 507, 509 are disposed on each side of the mandrel 508 and provide support to the coil as it is wound; the diameter of the plates 507, 509 is slightly greater than the final diameter of the coil. The coiler 26 also includes nine pulleys, designated A-J in the Figure. A belt 510 is disposed around the mandrel 508, contacting the mandrel outer surface 506, and also around all of the pulleys except pulley G. When one of the pulleys, drive pulley A, is rotated by a motor 512, the belt 510 moves at a desired speed around the other pulleys and around the mandrel outer surface 506.

A ring 514 surrounds the mandrel 508 and is coaxial therewith. The ring 514 is supported by rollers 516, attached to the support structure 502, and can rotate relative to the mandrel 508. Take-up pulleys F and G are attached to the ring 514. An arm assembly 518 is pivotally attached to the ring 514 for rotation about the axis 520 of the pulley F. The arm assembly 518 includes an arm 522; the free end 524 of the arm 522 has a pulley E attached thereto. A torque chain assembly 526 includes a chain 528 which surrounds the ring 514, and is coupled to the arm assembly 518 and to the ring 514. The chain 528 is disposed upon a raised portion 530 on the outer 30 surface 532 of the ring 514 (FIG. 5i) and passes around sprocket wheels 534, 536. The wheel 534 is driven by a torque motor 538.

The pulleys of the coiler 26 are arranged such that the belt 510 exerts a sufficient pressure against the mandrel outer surface 506 so as to be in non-slip contact therewith. As the belt 524 moves, the mandrel 508 rotates, and the mandrel outer surface 506 has a tangential speed which is equal to the speed of the belt 510. The belt 510 has a smooth side 540 and a ridged side 542. To insure that the belt 510 does not slip as it moves around the pulleys, the ridged side 542 of the belt 510 engages slots 548 in the pulleys. As shown in FIG. 5a, the smooth side 540 of the belt 510 initially contacts the mandrel outer surface 506. As the wire 10 is wound on the mandrel 508 and formed into a coil 544, the smooth side 540 contacts the outer surface 546 of the coil 544. (See FIG. 5b.)

From the drive pulley A, the belt 510 passes sequentially around a horizontally moveable compensator pulley B, a stationary idler pulley C, a vertically moveable delivery pulley D, and then around the mandrel outer surface 506. From the mandrel 508, the belt 510 passes around the pulleys E and F on the arm assembly 518, around two stationary idler pulleys H and I, and around the drive pulley A to complete the loop. A first portion 550 of the belt 510 extends between the delivery pulley D and the mandrel 508, and forms a nip 552 with the mandrel outer surface 506. The compensator pulley B is attached to the end of a piston 554 which moves within cylinder 556 of a stationary pneumatic actuator 558 secured to the support structure 502. The actuator 558 maintains a constant force $F_b$ to the left on the pulley B. The delivery pulley D is attached to a plate 560 by a shaft 561, and the tube 503 is connected to the plate 560 by means to be described below. The plate 560 is attached to the end of a piston 562 which moves within cylinder 564 of a stationary actuator 566 secured to the support 502. The actuator 566 exerts a constant upward force $F_d$ on the plate 560, which is equal to a downward gravitational force $F_m$ due to the combined mass of the plate 560, pulley D and tube 503.

Figure 5B:
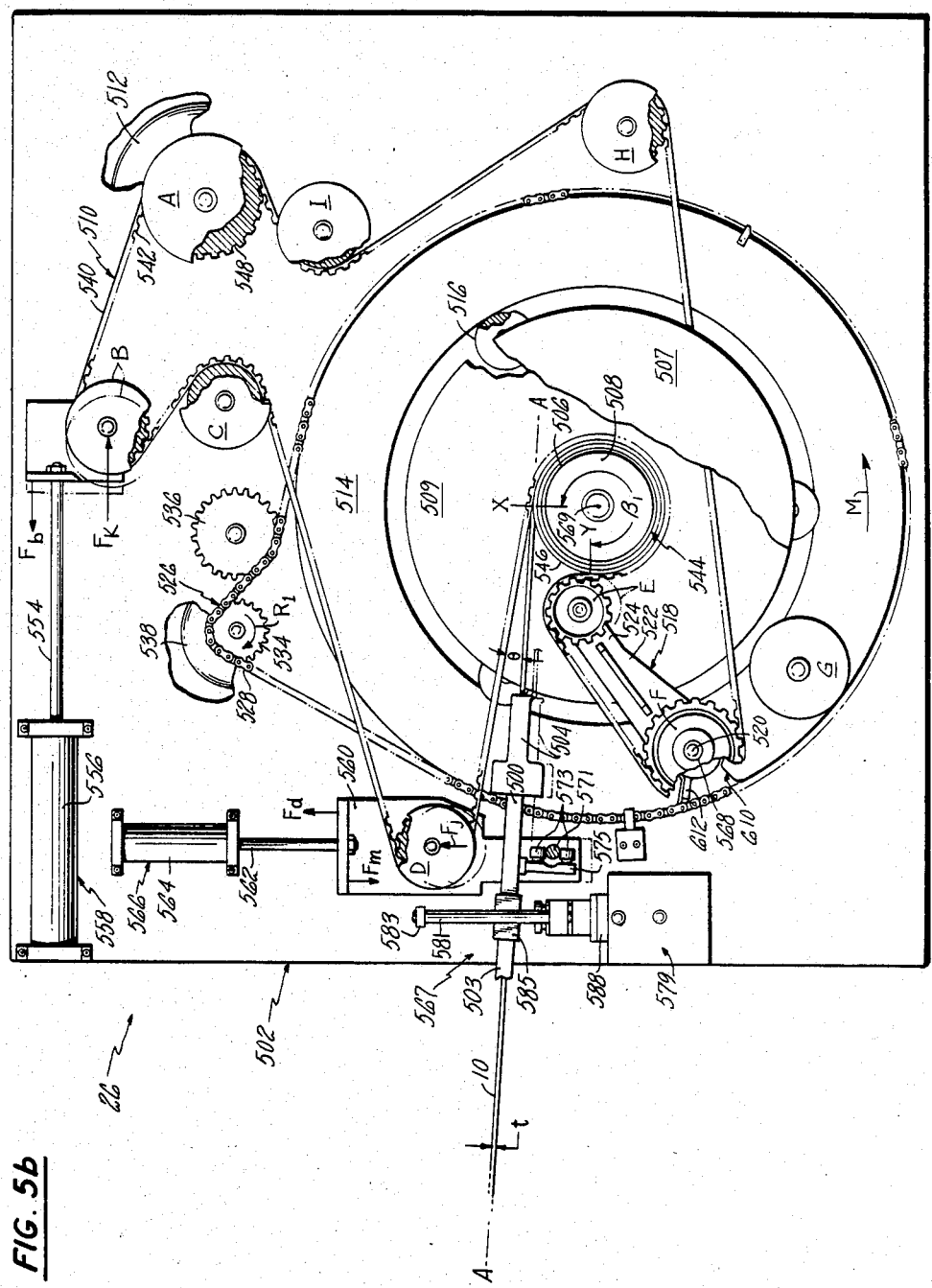
FIG. 5b is a front view, partly broken away, showing the coiler at the end of the first winding stage.

Referring to FIG. 5a, the delivery nozzle 504 is positioned to direct the lead end 11 of the wire 10 into the nip 552, substantially along the straight line A—A which forms a shallow angle $\theta$ with the belt first portion 550, which is preferably less than about 10°, and most preferably between about 6 and 8°. When the lead end 11 of the wire 10 reaches the mandrel 508, the wire 10 is coiled "on the fly"; there is no buckling of the wire 10 as the wire lead end 11 attaches to the mandrel outer surface 506. The belt 510 holds the wire 10 against the outer surface 506, and the wire 10 begins to be wrapped around the mandrel 508 to form the coil 544. (FIG. 5b.) As will be described hereinbelow, a traverse assembly 567 moves the tube 503 (and thus the nozzle 504) in reciprocal fashion across the width of the mandrel 508, between the plates 507, 509, as the wire passes from the nozzle 504. As a result, the wire 10 is wound into a coil 544 having a width equal to the distance between the plates 507, 509. Once a layer of the wire 10 covers the mandrel outer surface 506, the belt 510 then contacts the outer surface 546 of the coil 544. As the wire 10 is wound, each layer of the coil 544 is tightly held against the preceding layer. The belt 510 exerts a pressure against the coil outer surface 546 which is sufficient keep the mandrel 508 rotating, and to prevent the belt 510 from slipping on the coil outer surface 546. As a result, the coil outer surface 546 has a tangential speed equal to the speed of the belt 510. In other words, the linear speed of the belt 510 and the linear speed of the wire 10 are maintained equal throughout the winding process.

As layers of the wire 10 build up on the mandrel 508, the belt first portion 550 is displaced in the vertical direction at the mandrel 508 by increments equal to the thickness of the wire, t. As the belt 510 is displaced, it exerts an upward force $F_j$ against the delivery pulley D. When the sum of the forces $F_j$ and $F_d$ is greater than the downward force Fm, the piston 562 is pushed into the cylinder 564, and the plate 560 moves vertically until the magnitude of the force $F_j$ is zero. In this manner, the plate 560 moves up incremental distances approximately equal to the thickness of a layer of wire as the coil 544 increases in thickness by the same incremental amounts, and the angle of inclination of the first belt portion 550 to a horizontal plane remaining substantially constant.

Figure 5C:
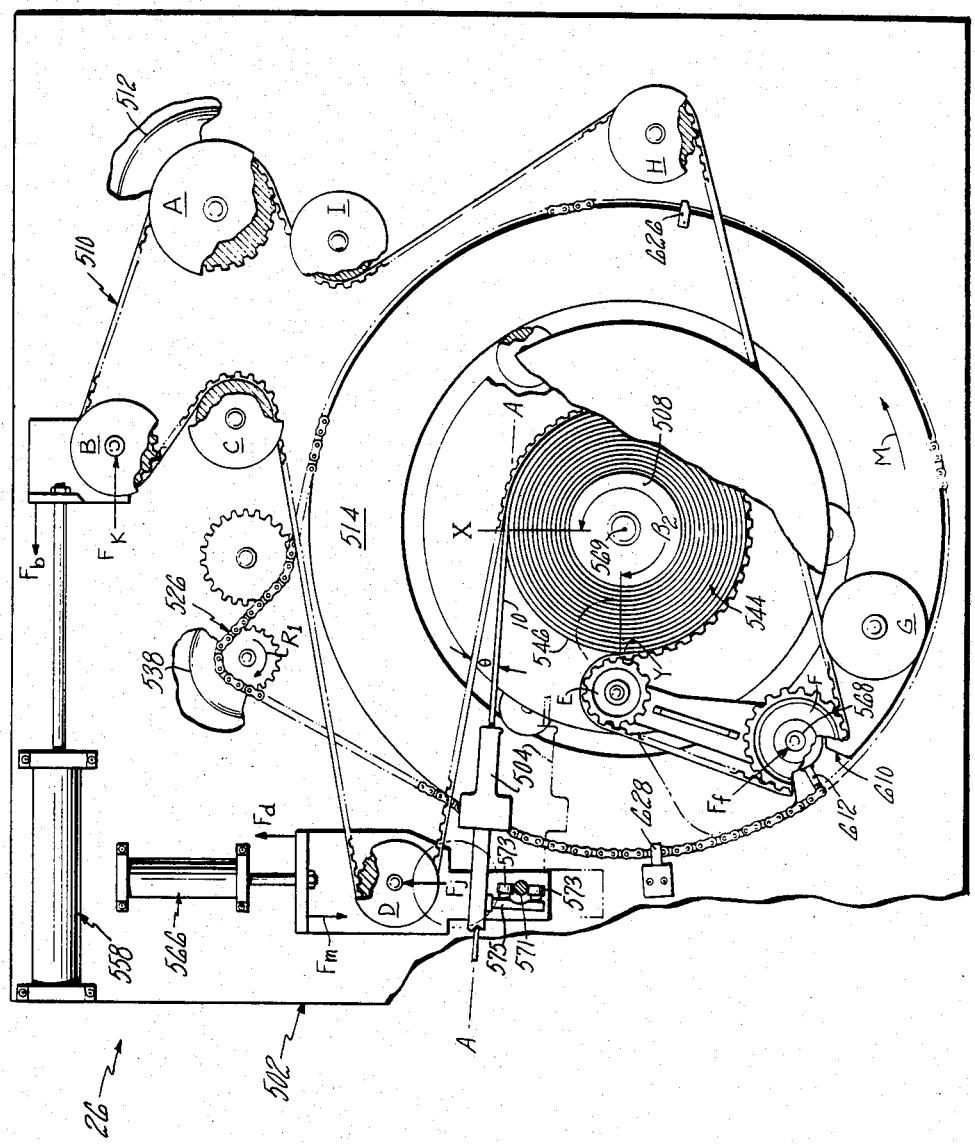
FIG. 5c is a front view, partly broken away, showing the coiler during the second winding stage.
Figure 5D:
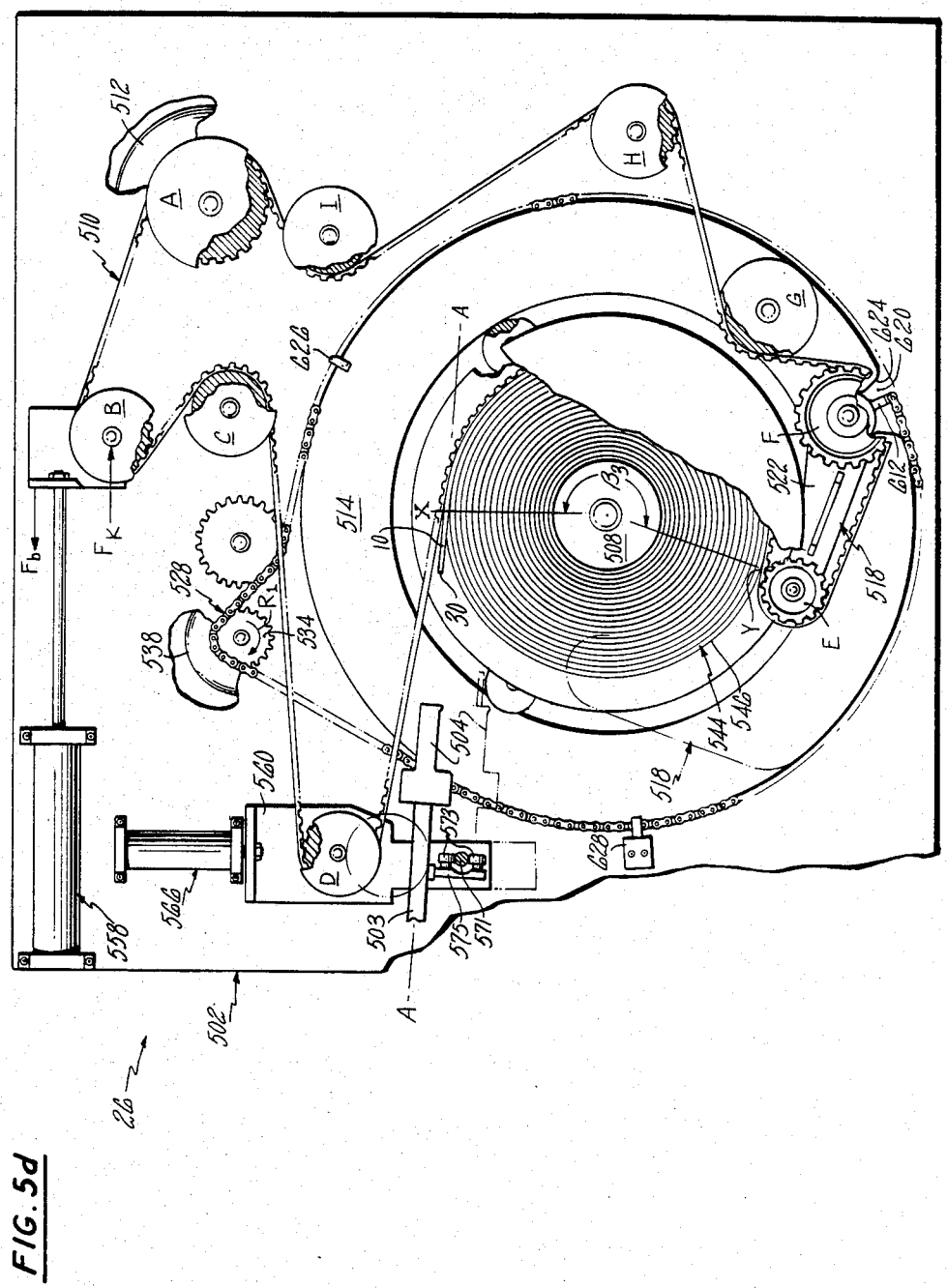
FIG. 5d is a front view, partly broken away, showing the coiler at the end of the second winding stage.
Figure 5E:
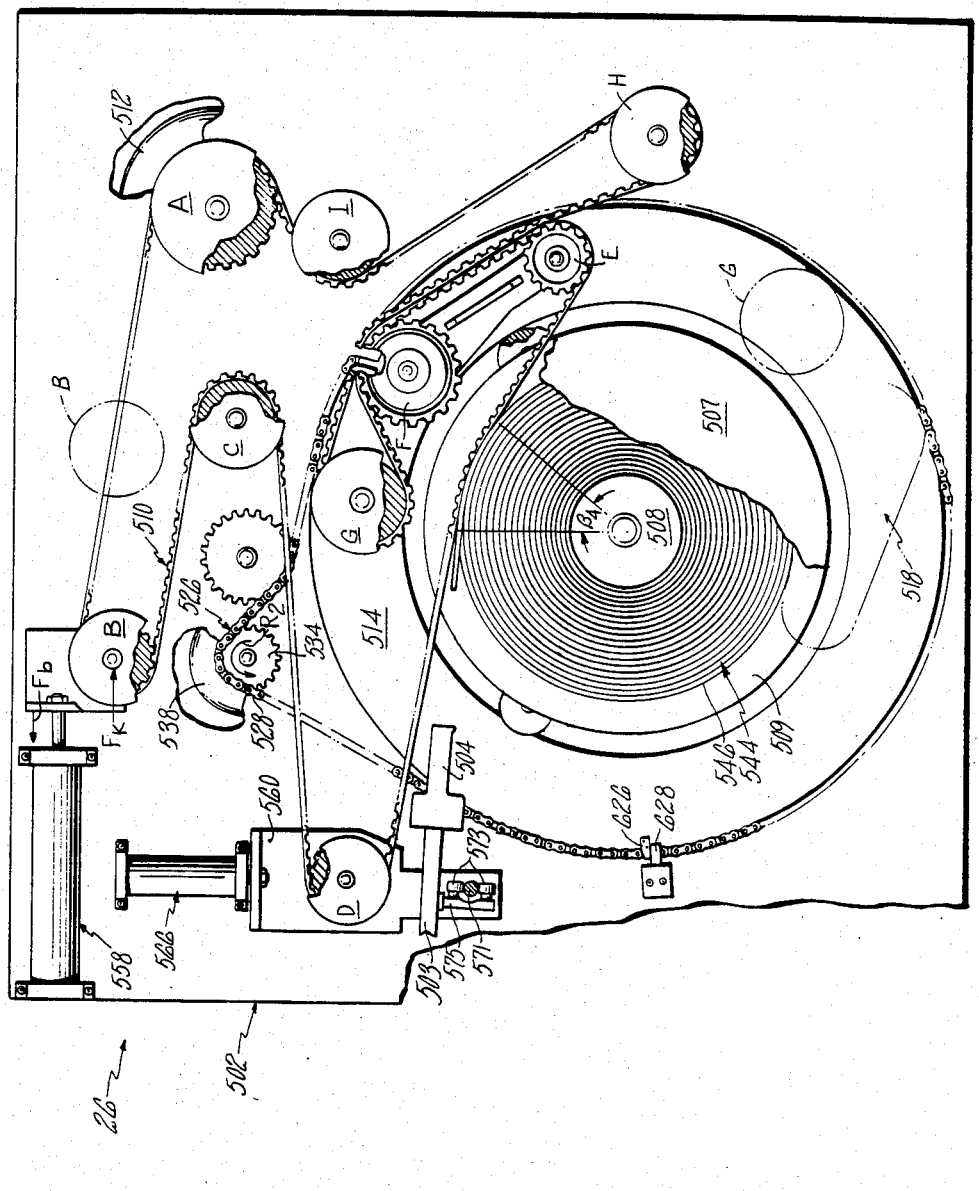
FIG. 5e is a front view, partly in section, showing the coiler at the end of the third winding stage, just before removal of the coil.
Figure 5F:
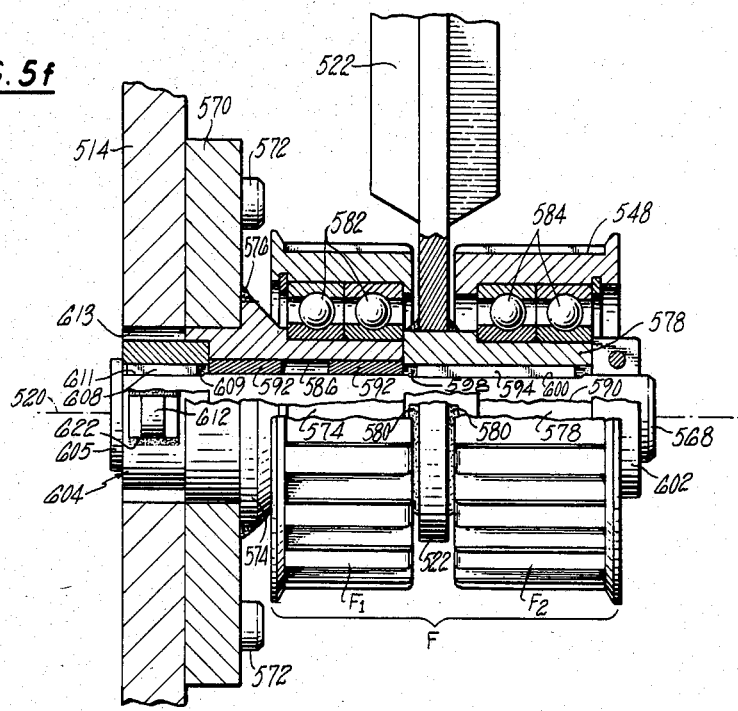
FIG. 5f is a view partly in section and partly broken away, showing the arm assembly of the coiler.
Figure 5G:
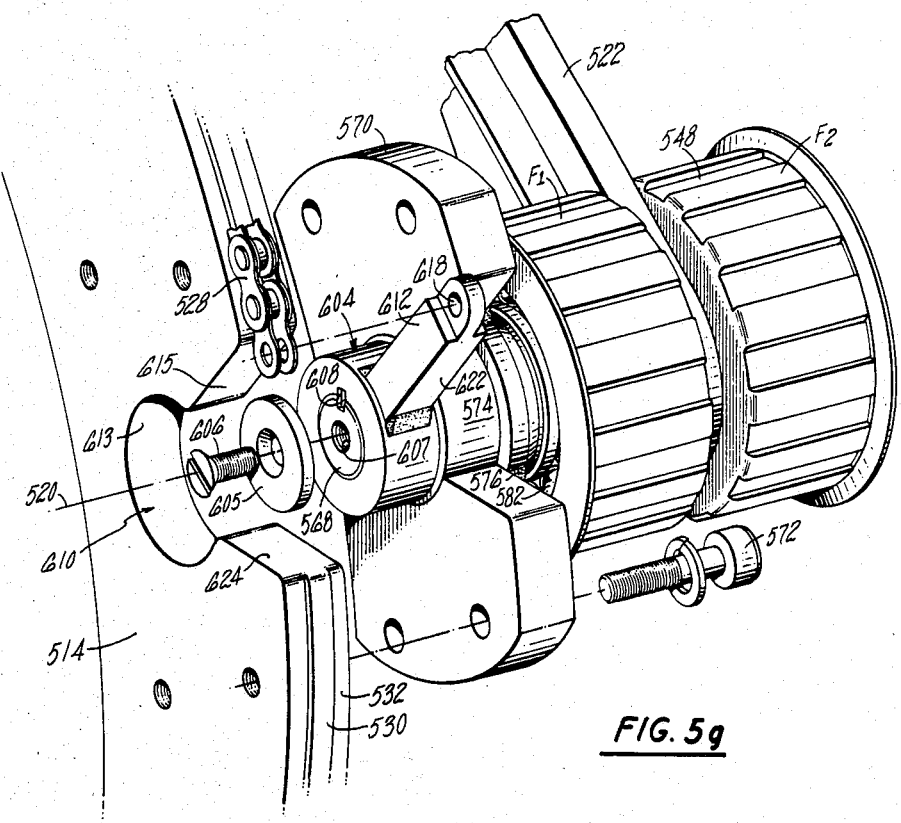
FIG. 5g is an exploded, perspective view of the arm assembly of the coiler.
Figure 5H:
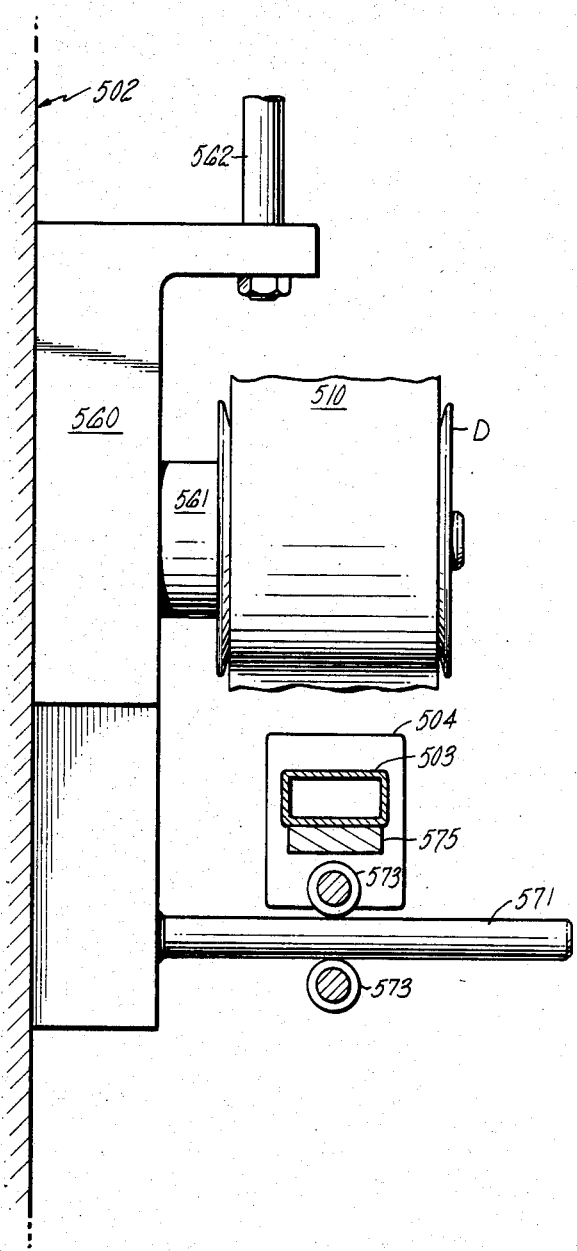

As best shown in FIGS. 5a and 5h, a shaft 571 extends outwardly from the plate 560, parallel to the axis of the pulley D. The shaft 571 vertically supports the delivery tube 503 through roller bearings 573 rotatably mounted in a bracket 575 welded to the tube 503. Thus, as the plate 560 moves vertically, the nozzle 504 and the pulley D move vertically, together, and the tube 503 pivots substantially about its inlet end 501. The tube pivot point 505 is located sufficiently far upstream of the shaft 571 such that the angle $\theta$ between the line A—A and the belt first portion 550 changes by only several degrees (i.e., remains substantially constant) throughout a full coiling cycle. Also, because the nozzle 504 moves vertically approximately the same distance as the pulley D, the nozzle 504 is always aimed substantially into the nip 552. The arrangement of shaft 571 and roller bearings 573 permit the tube 503 to traverse the width of the mandrel 508 as it moves vertically.

The traverse assembly 567 is best understood by referring to FIGS. 5a and 5i. The traverse assembly 567 includes a vertical guide assembly 577 and a traverse control 579. The vertical guide assembly 577 includes a pair of spaced apart vertical, cylindrical guides 581, the upper and lower ends of which are secured to brackets 583. The tube 503 passes between the guides 581. Wear plates 585 are secured to each side of the tube 503, and a flat end 587 of each plate 585 slidably bears against the cylindrical surface of one of the guides 581. The tube 503 can, therefore, slide vertically between the guides 581.

The lower bracket 583 of the guide assembly 577 is secured to a carriage 588 by a pin 589, which permits the assembly 577 to pivot about the pin axis 591. The carriage 588 is traversed on slide rods 593 attached to the control 579. The slide rods 593 extend parallel to the axis 569 of the mandrel 508. A mechanism, not shown, within the carriage 588, communicates either mechanically or electronically with the moving belt system of the coiler 26 to cause the carriage 588 to traverse on the slide rods 593 at an appropriate speed. As the carriage 588 traverses, the tube 503 moves with it (pivoting about the point 505 near its inlet end 501), thereby causing the nozzle 504 to traverse the mandrel 508. The traverse speed can be adjusted to cause the wire 10 to be wound into a coil 544 having a preselected pitch.

As previously mentioned, the pulleys are positioned so that at the start of the winding process, the tension in the moving belt 510 results in the belt 510 exerting sufficient pressure against the mandrel outer surface 506 to rotate the mandrel 508. As the wire 10 builds up on the mandrel 508, the arm assembly 518 is caused to rotate counterclockwise about its axis of rotation 520. Also, the tension in the belt 510 increases. This increase in tension must be reduced, to prevent belt breakage; it must be reduced in such a manner that the belt 510 maintains sufficient pressure against the coil outer surface 546 to keep the mandrel 508 rotating at the desired speed. In this exemplary embodiment, during what will hereinafter be referred to as the first stage of the winding process, as the belt tension increases, the belt 510 exerts a force $F_k$ on the compensator pulley B. When the force $F_k$ is greater than the force $F_b$ applied by the pneumatic actuator 558 on the pulley B, the pulley B moves to the right, as shown in FIG. 5b, until the magnitude of the forces $F_b$ and $F_k$ are equal. The first winding stage is completed after three layer of wire 10 are built up on the mandrel 508, at which point the compensator piston 554 is at its maximum extension.

During a second stage of the winding process, as the wire 10 continues to be wound on the mandrel 508 and as the tension in the belt 510 increases, the belt 510 exerts a force $F_f$ (FIG. 5c) on the shaft 568 supporting the pulley F, which creates a counterclockwise moment M on the ring 514 through apparatus to be hereinafter described. The moment M causes the ring 514 and the pulleys thereon to move around the mandrel 508 in a circular path concentric with the mandrel axis of rotation 569. The extent to which the ring 514 rotates as the wire 10 is being coiled depends on whether the moment M created by the belt tension is greater than or equal to a clockwise torque, or moment, $R_1$ applied to the ring 514 by the torque chain assembly 526. To best understand this mode of operation, it is necessary to explain the role of the torque chain assembly 526 in balancing the forces created by the belt 510 on the ring 514 during the second stage of the winding process.

The construction and operation of the arm assembly 518, the torque chain assembly 526, and the ring 514 are best understood by referring to FIGS. 5f and 5g. An annular plate-like bracket 570 is fixedly attached to the ring 514 by bolts 572, and a first shaft 574 is welded to the bracket 570 at 576. The arm 522 is welded at 580 to a second shaft 578 adjacent to the first shaft 574; and the arm 522 and second shaft 578 thereby rotate together. As is seen in the Figures, the pulley F is a split pulley: One half, $F_1$, is disposed on bearings 582 on the first shaft 574; and the other half, $F_2$, is disposed on bearings 584 on the second shaft 578. The support shaft 568, having an axis of rotation 520 common with the axis of the pulley F, passes through aligned bores 586 and 590 in the first shaft 574 and second shaft 578, respectively. The support shaft 568 is rotatably disposed within bushings 592 in the fixed first shaft 574. A key 594 is disposed in aligned slots 598 and 600 within the second shaft 578 and support shaft 568, respectively, and couples these components together. The support shaft 568 is held axially at one end by a split collar 602. Its opposite end is attached to a finger collar 604 by a washer 605 and screw 606. The screw 606 extends into a threaded portion 607 of the support shaft 568. Also, a key 608 is disposed in keyways 609, 611 aligned in the finger collar 604 and support shaft 568, respectively. The finger collar 604 is located and can rotate within a cylindrical portion 613 of a key hole shaped cutout 610 in the ring 514. The collar 604 also includes a finger 612 which extends radially outwardly in the plane of the ring 514 and within a wedge shaped portion 615 of the cutout 610. Interference between the cutout 610 and the finger 612 limits the angle through which the shaft 568 (and thus the arm 522) can rotate about the axis 520.

The chain 528 is fixedly connected to the finger 612 on the collar 604 by a pin (not shown). (For purposes of clarity, the chain 528 is not shown in FIG. 5f.) The clockwise torque $R_1$ of the motor 538 acts on the finger 612 to urge the arm 522 to rotate clockwise, which keeps the arm 522 tightly pressed against the coil outer surface 546 during the winding process. However, after the first winding stage is complete, the force $F_f$ acting on the support shaft 568 intermittently becomes sufficiently large to overcome the torque $R_1$. When this occurs, the ring 514 rotates counterclockwise to relieve the build up in belt tension while maintaining sufficient belt tension (i.e. sufficient friction forces against the coil 544) to assure continued rotation of the mandrel 508 at the proper speed.

More specifically, an incremental amount of ring rotation occurs during the second winding stage, concurrent with the counterclockwise rotation of the arm 522, as each new layer of the coil 544 is formed. As the ring 514 rotates, the belt 510 unwraps from the coil outer surface 546. By this it is meant that the included angle $\beta$ decreases. $\beta$ is measured from the beginning point of belt contact with the coil outer surface (point X in FIGS. 5b, 5c, 5d) to the end point of belt contact with the coil outer surface (point Y in FIGS. 5b, 5c, 5d). (Compare $\beta_1$ in FIG. 5b with $\beta_3$ in FIG. 5d). It should be noted, however, that because the coil circumference is increasing, the amount of the coil outer surface 546 which is contacted by the belt 510 actually increases as the second winding stage progresses. As the coil 544 increases in size on the mandrel 508, the combined weight of the mandrel 508 and coil 544 increases, and more force is required to keep the mandrel 508 rotating. Because more of the coil outer surface 546 is contacted by the belt 510 as the winding process continues, more rotational force is applied to the coil 544 such that slippage does not occur and the wire 10 continues to be wound at a constant rate.

As shown in FIG. 5c, after the ring 514 has rotated about 35° during the second winding stage, the belt 510 contacts the take-up pulley G. Further ring rotation in the counterclockwise direction results in the belt 510 becoming wrapped around the pulley G as it is unwrapped from the coil outer surface 546 (FIG. 5d). As will be described below, the take-up pulley G also assists in maintaining the required belt tension during a third winding stage.

The FIG. 5d shows the orientation of the coiler 26 at the end of the second winding stage, wherein the tail end 30 of the wire 10 has reached the coil 544. In this example, the ring 514 and the arm 522 have rotated counterclockwise approximately 90° and 30°, respectively, during the second winding stage. When winding longer segments of the same wire, or when winding thicker wire, the arm assembly 518 may be required to rotate further to completely wind the wire on the mandrel 508. The width of the wedge shaped portion 615 of the cutout 610 is selected to allow for such additional arm rotation. For example, note in FIG. 5d that a gap 620 still remains between the finger 612 and the forward wall 624 of the cutout 610 at the end of the second winging stage.

When the tail end 30 of the wire 10 reaches the coil outer surface 546, the rotation of the mandrel 508 is stopped by stopping the drive motor 512, preferably within one revolution of the mandrel 508, to prevent whipping of the tail end 30 of the wire 10. Contact of the belt 510 with the coil outer surface 546 also eliminates tail end whipping.

After the mandrel 508 has been stopped, a brake (not shown) within the mandrel 508 holds the mandrel 508 in a stationary position, and removal of the coil 544 from the mandrel is accomplished during the third winding stage. Referring to FIG. 5e, at the beginning of the third winding stage, the torque motor 538 reverses its direction of rotation and moves the chain 528 in a counterclockwise direction, thereby rotating the arm 522 until the finger 612 contacts the wall 624 of the cutout 610. Further movement of the chain causes the ring 514 to rotate counterclockwise until a projection 626 on the ring 514 contacts a stop 628 attached to the support 502. As the ring 514 rotates, the force $F_k$ on the compensator pulley B decreases, and the pulley B moves to the left. Also, rotation of the ring 514 causes the belt 510 to unwrap from the coil outer surface 546 and wrap around the take-up pulley G.

The mandrel 508 of the coiler 26 is collapsible, and of a type well known in the art. When the projection 626 contacts the stop 628, the mandrel collapses, whereby its diameter decreases, and it is withdrawn through a bore (not shown) in the plate 509. The coil 544 then falls into an appropriately positioned packaging container. After the coil 544 has been removed from the mandrel 508, the mandrel 508 is reinserted between the plates 507, 509 and resumes its original diameter. The torque motor 538 rotates the sprocket wheel 534 (and thus the chain 528) in a clockwise direction until the ring 514 is in the starting position, as shown in FIG. 5a. The actuators 558 and 556 move the compensator pulley B and the plate 560, respectively, to their starting positions, and the motor 512 accelerates the belt 510 to its operating speed so that the coiler 26 is ready to begin winding when a next wire lead end reaches the mandrel 508.

Referring to FIG. 1, as an example of the operation of the cutting and coiling apparatus 2 hereinabove described, a continuous length of wire 10 moves from the source 12, through the cutter 14, diverter 16, one of the conduits 24, 25 and into one of the coilers 26, 27. The wire 10 moves at a constant downstream speed of 2,400 feet per minute, and is cut by the cutter 14 into successive wire segments having a length of 250 feet. The distance between the cutter 14 and the coiler 26 is approximately 30 feet; thus, it is not until most of the 250 feet of wire 10 is wound by one of the coilers 26, 27 that the wire 10 is cut by the cutter 4. The tail end 30 of the wire segment moves through each piece of the apparatus 2, and when it reaches the coiler, the winding process is complete, except for removal of the coil from the mandrel upon which it is wound. Meanwhile, the next lead end of wire is being directed by the diverter 16 to another coiler, and the process continues. At no time need the wire speed be altered; and no gap need be maintained between successive wire segments. As a result, process efficiencies are substantial, and the costs to produce coiled wire segments are reduced.

Although the invention has been shown and described with respect with a prefered embodiment thereof, it should be understood by those skilled in the art that other various changes and omissions in the form and detail thereof may be made therein without departing from the spirit and scope of the invention.

I claim:

1. A machine for cutting a moving wire passing therethrough, comprising:
   (a) a pair of knife carriers, each of said carriers including a knife blade having a cutting edge, each of said knife carriers having a bore therethrough;
   (b) a pair of parallel shaft means, each of said shaft means including a carrier shaft and a coaxial drive shaft having an axis of rotation, each of said carrier shafts including an eccentric having a center offset from said shaft axis, one of said carrier shafts extending through said bore in each of said knife carriers, wherein each of said eccentrics mates for rotation with the bore in its respective knife carrier;
   (c) means for connecting each knife carrier to its respective drive shaft for rotation therewith, said connecting means comprising a pair of knife wheels, each of said wheels having a cut-out therein for receiving one of said knife carriers and including means for trapping in and limiting axial movement of its respective knife carrier, said connecting means further comprising blade guide means attached to each of said knife wheels; said guide means rotatable about an axis parallel to its respective drive shaft axis, each of said blade guide means having a slot therethrough and one of said knife blades extending through each of said slots, said knife blades being slidable therewithin;
   (d) means for rotating said drive shafts; and
   (e) means associated with each of said shaft means for coupling said carrier shaft to its respective drive shaft such that each coupled carrier shaft and drive shaft rotate together about their respective drive shaft axis, and for uncoupling said carrier shaft from its respective drive shaft and stopping the rotation of said uncoupled carrier shafts such that each knife carrier and its respective cutting edge rotates about the center of the eccentric on which it is disposed, wherein each cutting edge moves in reciprocal fashion in a substantially radial direction relative to said shaft axis, said means for stopping rotation including means for stopping rotation of said carrier shafts in a position wherein said cutting edges meet substantially on a line intersecting and perpendicular to both of said drive shaft axis when said cutting edges are at their maximum radial extent, and cooperate to cut the moving wire as said knife carriers rotate.

2. The machine of claim 1, wherein each of said knife blades has an inner end and an outer end, both of said ends having a cutting edge thereon, said blades being reversable within their respective knife carrier such that either end may be oriented to cut the wire.

3. The machine of claim 2, wherein each of said cutting edges has a width at least two times the width of the wire to be cut, the machine including means for changing the direction of the wire such that a desired portion of said cutting edges cuts the wire.

4. The machine of claim 1, wherein said knife carrier has a front side and a rear side, and said cut-out extends completely through said carrier, wherein said trapping means includes a front plate attached to said carrier front side and a rear plate attached to said carrier rear side.

5. The machine of claim 3, wherein said front Plate and said knife wheel each has a recess therein, and said blade guide has opposed ends, wherein each of said ends is disposed in one of said recesses.

* * * * *